US012135470B2

(12) United States Patent
Ekkels et al.

(10) Patent No.: US 12,135,470 B2
(45) Date of Patent: Nov. 5, 2024

(54) ELECTROACTIVE LENS ASSEMBLY

(71) Applicant: Morrow N.V., Zwijnaarde (BE)

(72) Inventors: Philip Ekkels, Zwijnaarde (BE); Wouter Woestenborghs, Zwijnaarde (BE); Jelle De Smet, Zwijnaarde (BE)

(73) Assignee: Morrow N.V., Zwijnaarde (BE)

( * ) Notice: Subject to any disclaimer, the term of this patent is extended or adjusted under 35 U.S.C. 154(b) by 304 days.

(21) Appl. No.: 17/427,053

(22) PCT Filed: Jan. 30, 2020

(86) PCT No.: PCT/EP2020/052373
§ 371 (c)(1),
(2) Date: Jul. 29, 2021

(87) PCT Pub. No.: WO2020/157245
PCT Pub. Date: Aug. 6, 2020

(65) Prior Publication Data
US 2022/0107510 A1    Apr. 7, 2022

(30) Foreign Application Priority Data

Jan. 30, 2019  (NL) .................................... 2022478

(51) Int. Cl.
*G02C 7/08*  (2006.01)
*G02F 1/29*  (2006.01)

(52) U.S. Cl.
CPC ............. *G02C 7/083* (2013.01); *G02F 1/294* (2021.01); *G02C 2202/16* (2013.01); *G02C 2202/20* (2013.01); *G02F 2202/28* (2013.01)

(58) Field of Classification Search
CPC .............. G02C 7/083; G02C 2202/16; G02C 2202/20; G02F 1/294; G02F 2202/28
(Continued)

(56) References Cited

U.S. PATENT DOCUMENTS

2007/0242173 A1* 10/2007 Blum ..................... G02F 1/1345
349/13
2009/0204207 A1  8/2009 Blum et al.
2017/0357141 A1* 12/2017 De Smet .......... B29D 11/00817

FOREIGN PATENT DOCUMENTS

CN       102083390 A     6/2011
CN       104035260 A    10/2017
(Continued)

OTHER PUBLICATIONS

International Searching Authority of WIPO; PCT International Search Report and Written Opinion, International Application No. PCT/EP2020/052373, mailed Apr. 20, 2020, 11 pages.
(Continued)

*Primary Examiner* — Michael H Caley
*Assistant Examiner* — William D Peterson
(74) *Attorney, Agent, or Firm* — McDonnell Boehnen Hulbert & Berghoff LLP

(57) ABSTRACT

An electroactive lens, method, and pair of glasses are described. The electroactive lens forms a stack of at least three elements. A first transparent body is a first lens element having a first optical axis. A second transparent body is a second lens element having a second optical axis. At least one lens foil sandwiched between the first and second transparent body comprises a first and second transparent electrode, and a Fresnel lens and liquid crystalline material therebetween to define an optical device. The first and second transparent electrodes are electrically coupled to terminals and are configured to receive a voltage for operating the switchable lens. First and second conductive plug are positioned relative to the optical axis of the Fresnel lens such that radial lines extending from the optical axis to the first and second conductive plugs mutually enclose an angle of less than 120, 90, or 60 degrees.

19 Claims, 17 Drawing Sheets

(58) Field of Classification Search
USPC .......................................................... 349/13
See application file for complete search history.

(56) References Cited

FOREIGN PATENT DOCUMENTS

| | | |
|---|---|---|
| EP | 2405295 A1 | 1/2012 |
| EP | 3255479 A1 | 12/2017 |
| JP | 2008519317 A | 10/2012 |
| JP | 2011158634 A | 6/2014 |
| WO | 2017/211899 A1 | 12/2017 |
| WO | 2019101966 A1 | 5/2019 |

OTHER PUBLICATIONS

International Preliminary Examining Authority of WIPO; PCT International Preliminary Report on Patentability with notification of transmittal, International Application No. PCT/EP2020/052373, mailed May 11, 2021, 12 pages.
China National Intellectual Property Administration; notification and text of the first office action and search report for Chinese patent application No. 202080012006.4, dated Aug. 29, 2023.
Japan Patent Office; office action with notice of reasons for rejection for Japanese patent application No. 2021-544386, office action mailed Sep. 4, 2023.

\* cited by examiner

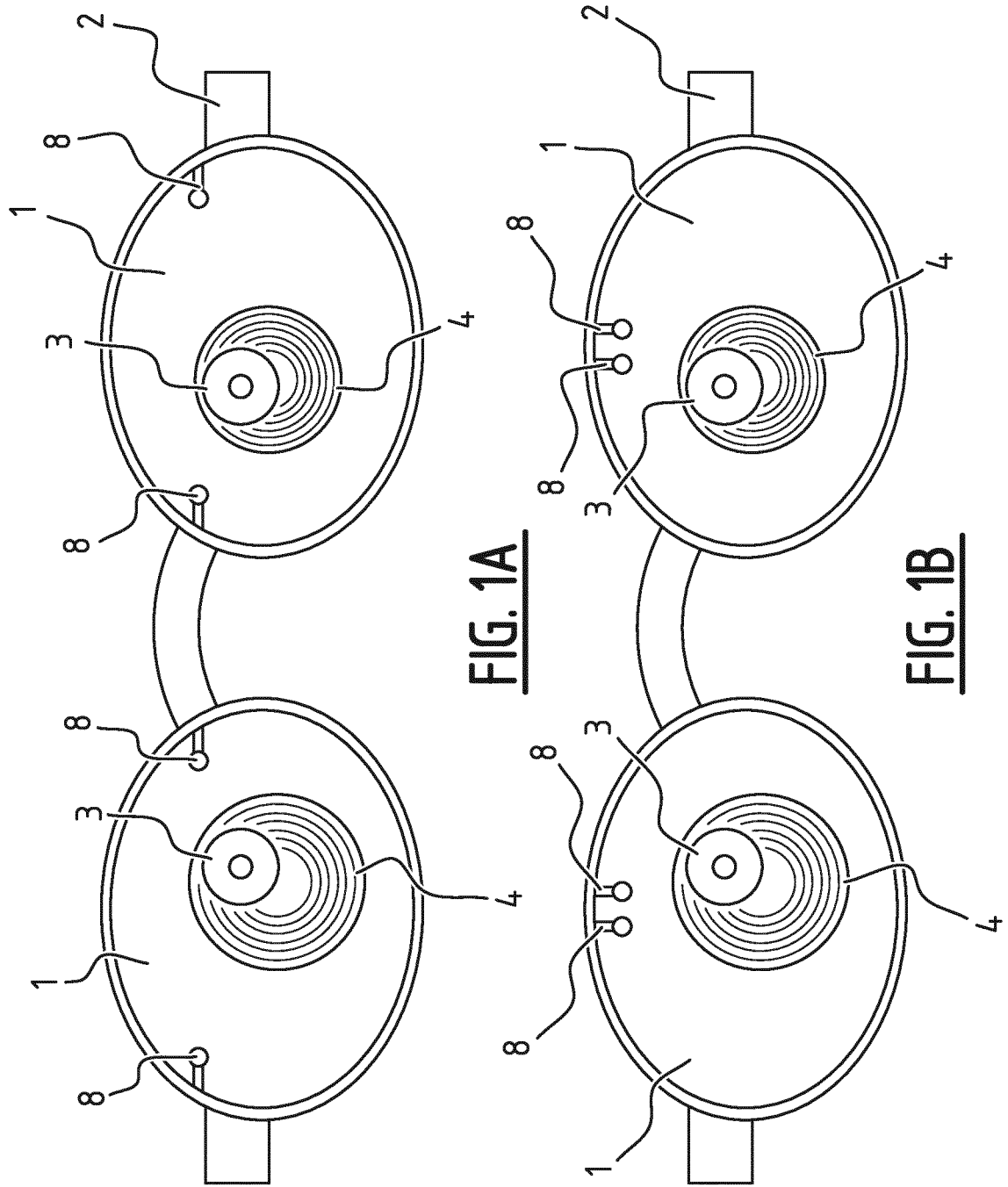

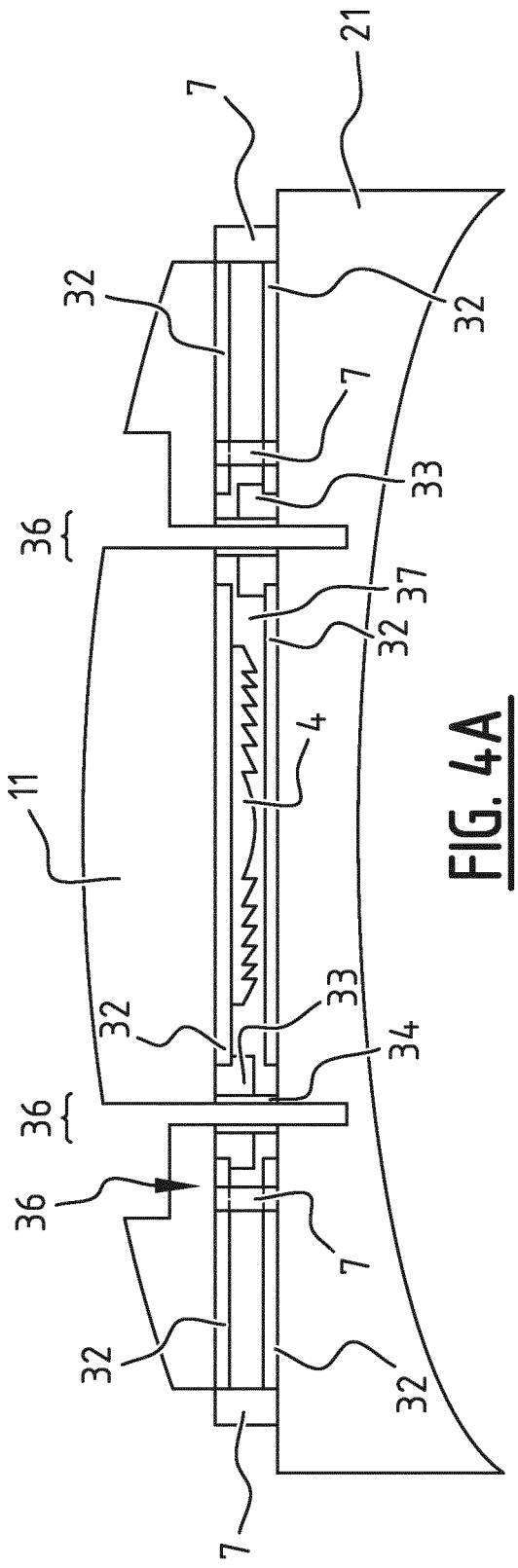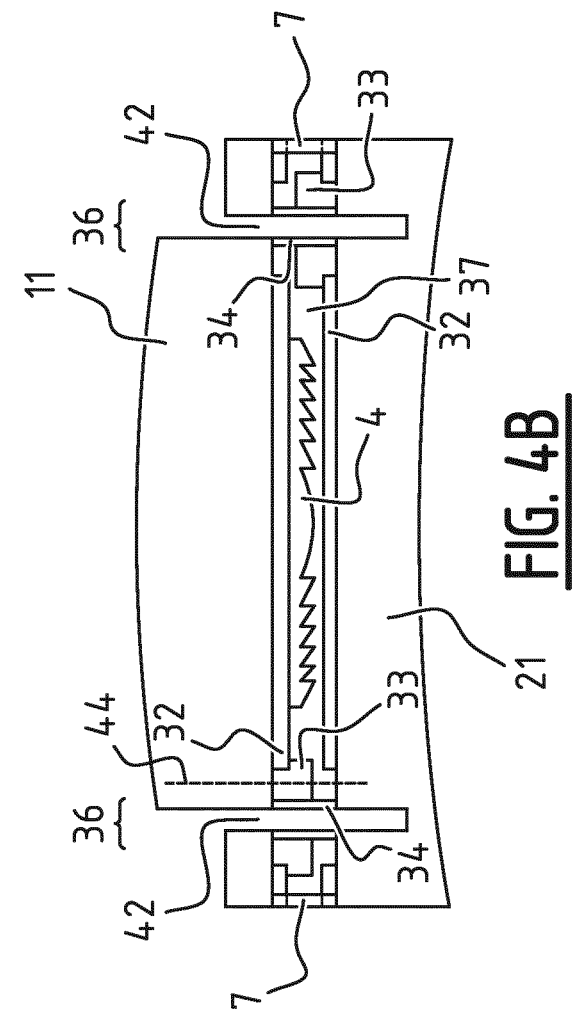
FIG. 4A
FIG. 4B

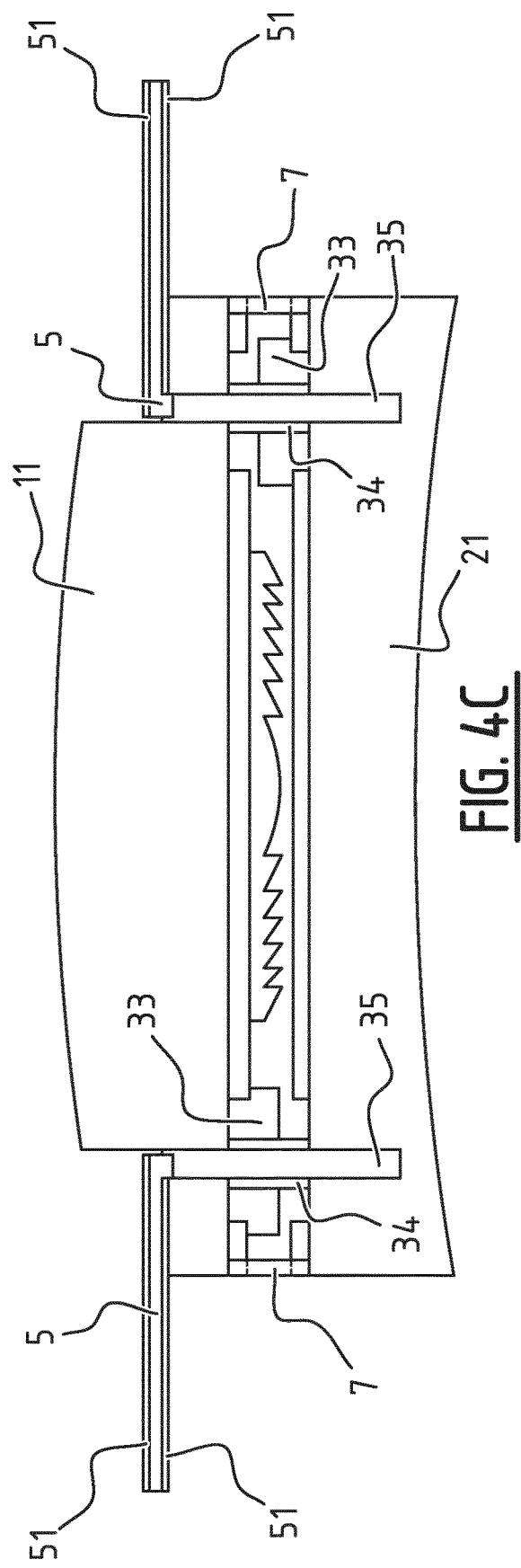
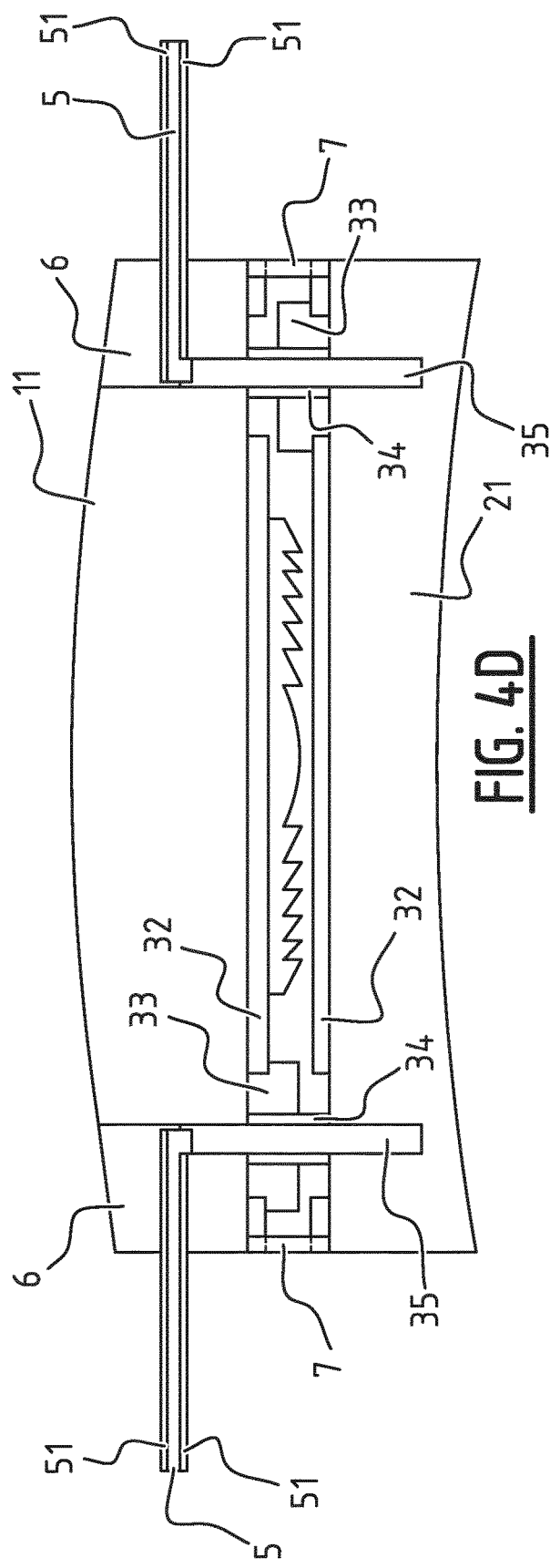

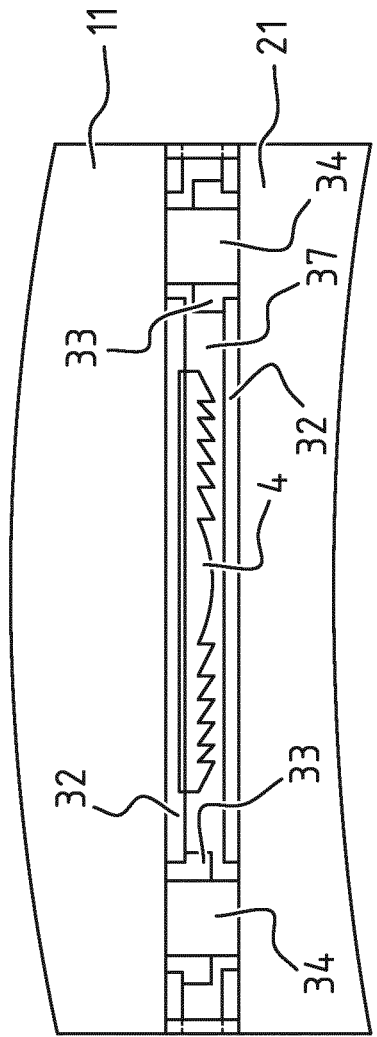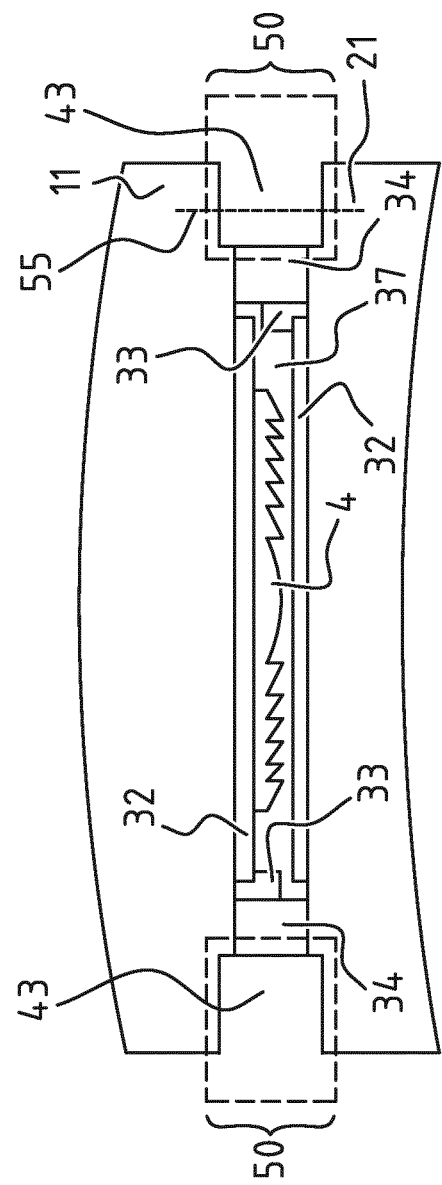

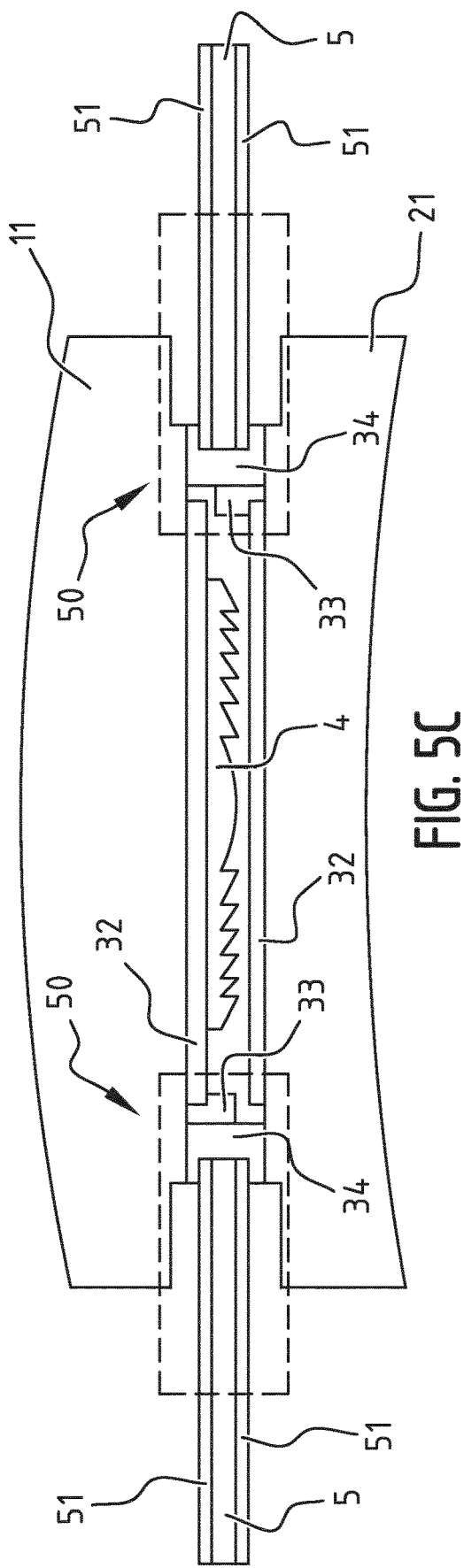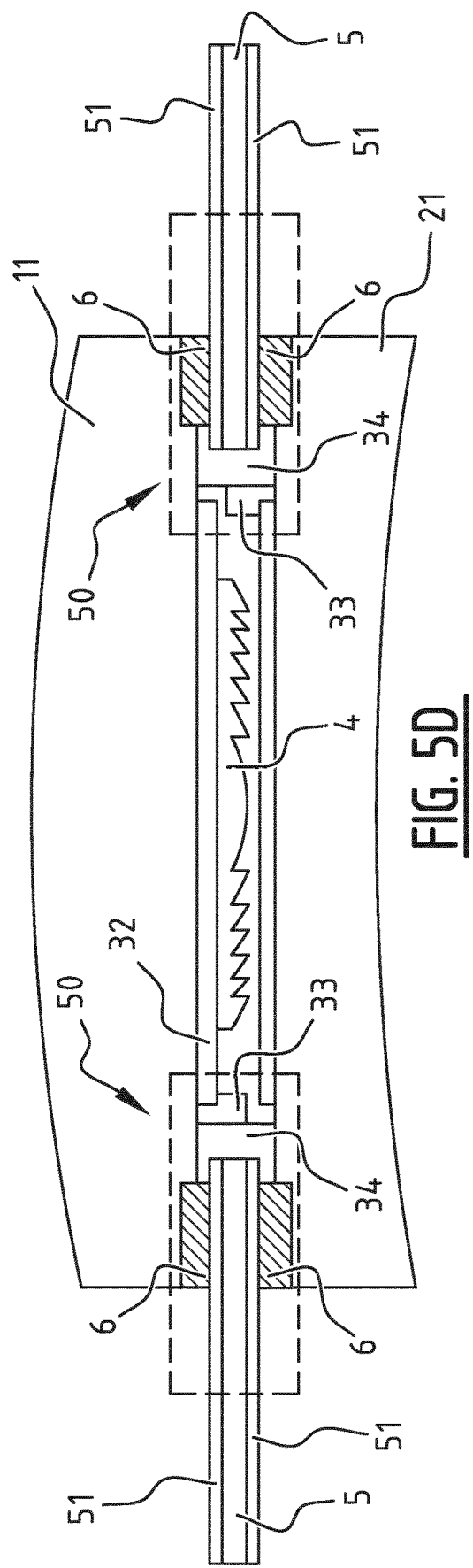

ELECTROACTIVE LENS ASSEMBLY

REFERENCE TO RELATED APPLICATION

This application claims priority to Netherlands patent application no. 2022478, filed on Jan. 30, 2019 and granted on Aug. 18, 2020 as Netherlands patent no 202248. Netherlands patent application no. 2022478 is incorporated herein by reference. The certificate for Netherlands patent no 202248 is dated Aug. 31, 2020.

FIELD OF THE DISCLOSURE

The present disclosure relates to a lens foil comprising a first substrate with a first transparent electrode, a second substrate with a second transparent electrode, and a Fresnel lens and liquid crystalline material between said transparent electrodes, wherein said transparent electrodes, said Fresnel lens and said liquid crystalline material define an optical device having an optical axis in at least one state of the optical device.

The present disclosure also relates to a method of manufacturing an electro-active lens system forming a stack of at least three elements, the stack comprising a first transparent body, a second transparent body and a lens foil, comprising the steps of providing the at least one lens foil onto the first transparent body and providing the second transparent body onto the at least one lens foil.

The disclosure further relates to the resulting electroactive lens system and to a pair of glasses comprising at least one electroactive lens system.

BACKGROUND OF THE DISCLOSURE

An ophthalmic lens is a product customized to a specific user, the lens is shaped to fit the frame of a pair of glasses such that the optical center is located in front of the user's pupil during use. The placement accuracy of the ophthalmic lens may be especially important for progressive lenses and to a lesser extent for bifocal lenses. In the case of electronic eyewear comprising a switchable lens with a limited size embedded in the eyeglass it is of essence that the center of the switchable lens is positioned accurately with respect to the position of the pupil of the wearer of the glasses. Therefore every eyeglass must be customized to the wearer with respect to both the height and lateral position of the switchable lens center.

In order to address this disadvantage, EP 2 405 295 A1 discloses a composite lens assembly. Herein an electro-active lens is present between a first and a second glass or plastic substrate. This unit is again present between two further transparent bodies, suitably configured as lenses, or lens halves. Contacts extend through one of these substrates and extend to a driver chip assembled to an outside surface of the unit. Thereto, a patterned conductive layer is present on this outside surface. Further contact pads are defined in the same conductive layer and are used to connect terminal wires that extend to opposed contacts of a battery, sidewise away from the unit. In order to integrate the composite lens assembly into spectacles, edging is deemed required, i.e. the removal of material on the edges so that the lens assembly fits into the spectacles. Thereto, the application proposes that either the two transparent bodies have a larger diameter than the lens unit or that an additional spacer is present sidewise of the lens unit.

As explained in the application, the electro-active lens may comprise either polarization-dependent nematic liquid crystal, or cholesteric crystal. In the former case, two units need to be stacked and oriented at a 90-degrees angle to eliminate the effects of birefringence. In the latter case, only one unit is needed.

The said patent application however does not specify how to establish reliable contacts to the electro-active lens unit. Multiple vertical interconnects are shown in FIG. 1 of said application. This however has the disadvantage that such vias are not transparent and thus disturb the view of a user of the spectacles. The presence of the driver chip on the surface of the lens unit leads to a further disturbance. The technical issue is however that several voltages are needed for the patterned electrodes so as to create the desired optical effect. As explained in the said patent application, one might use phase wrapping in order to reduce the number of contacts needed, but this does not simplify the driver either. Hence, one should expect that a plurality of vias remains needed.

An improved lens unit is known from EP 3 255 479 A1. This lens unit comprises a Fresnel lens. This enables the design of a lens unit with a small number of electrical connections. Moreover, a polymer substrate is used, allowing to bend the lens unit as desired. However, the said patent application does not provide any information as to the integration of the lens units into spectacles. This is highly desirable, as an effective manner of integration overall lowers cost. Moreover, users are keen on the design of spectacles, and an effective manner of integration would leave more design freedom to designers of spectacles.

SUMMARY

As such it is a first object of the present disclosure to provide an electroactive lens system that allows a high customizability of the lens layout and is still reliable with respect to the contacts.

It is a further object of the disclosure to provide a method of manufacturing such a lens system that allows a high customizability of the lens layout, while preferably still relying on equipment and techniques that are readily available in the ophthalmic industry.

It is a further object to provide an improved lens foil that is suitable for the manufacture of such lens system.

According to a first aspect of the present disclosure there is provided a lens foil comprising a first substrate with a first transparent electrode, a second substrate with a second transparent electrode, and a Fresnel lens and liquid crystalline material between said transparent electrodes, wherein said transparent electrodes, said Fresnel lens and said liquid crystalline material define an optical device having an optical axis in at least one state of the optical device. Herein the lens foil further comprises first and second conductive plugs extending through the lens foil, wherein the first and second conductive plug are positioned relative to the optical axis of the Fresnel lens such that radial lines extending from the optical axis of the Fresnel lens to the first and second conductive plug mutually enclose an angle of less than 120 degrees, preferably less than 90 degrees, more preferably less than 60 degrees.

According to a second aspect of the present disclosure, a stack of a first lens foil and a second lens foil of the disclosure is provided.

According to a third aspect of the present disclosure, a method of manufacturing an electroactive lens system is provided, the lens system forming a stack of at least three elements, the stack comprising a first transparent body, a second transparent body and a lens foil or a stack of lens foils according to the disclosure. The method comprises the steps of (1) providing the at least one lens foil onto the first transparent body; (2) providing the second transparent body onto the at least one lens foil; (3) generating at least one axial surface extending at least largely parallel to the plug axis in the first and second conductive plugs, (4) applying auxiliary conductive material that contacts directly said at least one axial surface of the conductive plug and (5) providing a conductive element configured for transmission of a voltage for operation of the optical device that is connected to the said auxiliary conductive material.

According to a fourth aspect of the present disclosure, an electroactive lens system is provided, which lens system forming a stack of at least three elements, wherein a lens foil or a stack of lens foils is sandwiched between a first transparent body and a second transparent body, wherein the conductive plugs have a plug axis extending substantially perpendicular to the transparent electrode and each of which conductive plugs is provided with an axial surface extending at least largely parallel to the plug axis, at which axial surface the conductive plugs each contact auxiliary conductive material that is connected to a conductive element extending outside the said stack.

According to a fifth aspect, a pair of glasses is provided comprising the electroactive lens system as disclosed herein.

This disclosure facilitates effective integration of a lens foil of the type mentioned in the opening paragraphs into a lens system. Use is made of a conductive plug extending in the axial direction (i.e. perpendicular to the transparent electrodes). Rather than applying an additional electrically conductive layer on an outside surface of the lens foil or electro-active lens, the method makes use of an axial surface of the conductive plug defined in the lens foil for establishing contact to auxiliary conductive material that extends to an outside of the lens system. The inventors have understood that this axial surface can be electrically contacted, for instance by means of an electrically conductive adhesive. Furthermore, the conductive plug is sufficiently large so as to make holes herein and/or contact it laterally to so as to expose such axial surface. Furthermore, in accordance with the above mentioned aspects of the present disclosure, the conductive plugs are positioned at the same side of the Fresnel lens, in other words that radial lines to the optical axis relative to said conductive plug mutually enclose an angle of less than 120 degrees, preferably less than 90 degrees, more preferably less than 60 degrees. This location on the said side eliminates the need for long wiring within the spectacles. In one implementation, such wires (i.e. conductive elements) may even be integrated into a single connector device, such as a flexible circuit.

In a preferred embodiment, a stack of a first and a second lens foil are present between the first and the second transparent body. More preferably, the liquid crystalline material in the said lens foils is nematic liquid crystalline material, and the optical devices of the first and second lens foil mutually enclose an angle of 90 degrees to eliminate the effects of birefringence. In this manner, the polarization-dependency of a single optical device is corrected by means of the second optical device. This implementation is suitable to create a pair of glasses, wherein both in the lens foil and in the transparent bodies lenses are defined. Alternatively, for sunglasses, a single lens foil is sufficient, wherein a polarizer of the sun glasses is used to eliminate the effects of birefringence of the optical device.

In one specific embodiment of the lens foil stack, the first and the second lens foils are mutually assembled such that the plug axis of the first conductive plugs of both lens foils are aligned. In one further implementation, the plug axis may further be electrically connected to each other, for instance by means of conductive glue. This implementation seems advantageous for manufacturing. The electrode layers in the center of the stack of the first and second lens foils may be contacted via one conductive plug. Hence, there is no need to ensure electrical isolation of the electrode layer of one optical device relative to the electrode layer of the other optical device.

Furthermore, the plug axis of the second conductive plugs of both lens foils may also be aligned, and possibly electrically connected. Since an electro-activated lens is preferably driven by means of an alternating current, there is no real distinction between input electrode and output electrode. This implementation also ensures that the conductive plugs are combined, enabling driving of the stack of first and second optical devices as a single optical device. Furthermore, this reduces the number of conductive plugs to a minimum, and thus minimizes visual impact.

In one further implementation, the conductive plugs are made after stacking the first and the second lens foils. This reduces the number of perforations to be filled with conductive material, which is beneficial for production costs.

In one advantageous embodiment of the method, lens elements of the transparent bodies such as lens halves, and the optical device in the lens foil may be arranged without complete alignment, or more precisely, wherein the optical axis of the lens foil is distinct from a common optical axis of the first and second lens elements. This embodiment makes use of the modularity of the lens foil and the method: the conductive plugs with their axial surfaces enable to create effective contacts after the assembly of the lens system. Therefore, this approach allows a highly customizable and modular method to manufacture active eyewear.

The methodology behind the method described herein allows the use of lens halves manufactured using commercially available ophthalmic equipment. Therefore, in one specific embodiment, the first and second lens elements are produced using a generic design and are only customized during the assembly process so as to fit the lens system to a frame or intended shape of spectacles. More particularly, apertures need to be generated into such lens elements so as to provide access to the conductive plugs. Use can be made of milling, drilling, ablation, etching or any other suitable removal technology as known per se Milling of the lens assembly is preferred as it can be carried out using equipment and procedures that is conventional in the ophthalmic industry. Thus, in one preferred implementation, the method further comprises milling the first, second and at least one lens foil along a circumference of a cut out region corresponding to a shape that corresponds to a shape of a frame wherein the electroactive lens is to be fitted.

In addition to facilitating assembly at different levels, it is observed that the methodology further facilitates repair and replacement of components of a pair of glasses including a electro-activated lenses (i.e. lens foils). For example glasses, frame, and/or electronics can each be exchanged and replaced easily. Moreover, it is an insight of the inventors that a fixed contact to the axial surface is more reliable than known approaches. Such a fixed contact is unsensitive to mechanical vibration, dirt of moisture. Hence the contact will be reliable, and can be made in various assembly conditions that are outside the control of a manufacturer of the lens foil.

In according to different embodiments of the method of the disclosure, the axial surface is generated either vertically through at least one of first and second lens elements and the at least one lens foil, or laterally, i.e. sidewise through the at least one lens foil and optionally (but typically) also partially through at least one of the first and the second transparent body. The generated aperture or hole will expose the said axial surface, and the auxiliary conductive material can be applied to said axial surface.

In the embodiment wherein the holes are arranged vertically, it appears advantageous to apply a conductive liquid or paste into the hole and generate a connection to a further conductive element such as a wire or flexible circuit at an outside of the first or second transparent body. While it is deemed preferable to form the hole at once through the at least one transparent body and the at least one lens foil, it is not excluded that the hole into the transparent body is made separately from that in the lens foil(s). Furthermore, the hole into the transparent body may have a different shape (such as a truncated cone) or a different diameter than that through the lens foil. Moreover, it is a possibility to apply holes through the transparent body prior to assembly of the lens foil with the transparent bodies.

In the embodiment wherein the hole is provided laterally, it appears preferable to assemble a wire or flexible circuit into the hole and establish the contact to the conductive plug by means of some conductive adhesive. It is however not excluded that the lateral hole would at least partially be filled with conductive material, such as conductive adhesive. The lateral hole or aperture may herein constitute a conductor channel, into which the said conductive element extends. The aperture may have a substantially cylindrical shape, with either a circular or oval cross-section. The aperture may otherwise be shaped as a truncated cone, at least partially. A shape with an increasing diameter with distance to the conductive plug may be beneficial to facilitate assembly of a conductive element. Preferably, the aperture has an orientation including an angle of in the range of 30-150 degrees, preferably 60-120 degrees to the plug axis of the conductive plug or even 75-105 degrees. More preferably said aperture does not extend through an exposed main face of the first and the second transparent body. In other words, an oblique orientation is not excluded. Such an oblique angle may be advantageous in view of a desired location of the conductive element at the outside of the system relative to the lens foil. It is observed for the sake of completeness that such an aperture or conductor channel principally may be present only in the at least one lens foil. However, in view of the foreseen dimensions of the lens foil and the conductive element, the aperture will in most embodiments extend also through at least one of the transparent bodies.

For the sake of clarity it is observed that the term 'at least substantially perpendicular to the transparent electrode' refers to an orientation that would normally be perpendicular but may deviate from exact perpendicular due to any manufacturing tolerances. In the event that the transparent electrode to which the conductive plug is connected would not be planar, it relates to the orientation of the transparent electrode at the area of the conductive plug. The term 'at least largely parallel with the plug axis' relates to an orientation that includes an angle of at most 30 degrees relative to said plug axis. It is foreseen that the axial surface is generated either by providing a hole in a direction substantially parallel to the plug axis or in a direction substantially perpendicular to the plug axis. However, it is not excluded that such a hole is provided with a specific oblique orientation and includes then an angle of at most 30 degrees. The term 'radial position' refers in the context of the present application to a position in a plane parallel to the transparent electrode. The term 'first lens element' and 'second lens element' may refer in the context of the present application to separate lenses, but are preferably cooperative lens elements. Such cooperative lens elements are also known as lens halves. It is observed that the transparent bodies preferably constitute lens halves. However, it is not excluded that at least one of the transparent bodes would be a body (or plate) without any optical function. This is dependent on the dioptrics of the spectacles. The term 'conductive element' refers to any contact element extending to an outside of the lens system. The conductive element may at its outside be provided with a contact pad, but may alternatively be provided with merely a tip or contact pad on a conductive circuit that is electrically coupled to the lens system. Generally, this is also referred to in the context of the application as a terminal. As to the optical axis of the lens foil, it is observed that the at least one lens foil is preferably substantially not contributing to the optical power of the lens system in one of its states (on or off). Therefore, this optical axis is structurally defined as the center of the Fresnel lens. The term 'tuning' is understood to refer in the context of the present application to relate to the relative orientation of two or more elements. For example, how the optical axis of the at least one lens foil is oriented/aligned with respect to the first and/or second optical axis of the first and second lens elements. It is observed that the optical axis of the lens foil may be oriented in parallel to the common optical axis, but that this is not necessary. A different orientation can be achieved, for instance, by means of cutting out the lens foil. For the sake of clarity, it is observed that the terms 'electroactive lens', 'optically switchable lens' and 'tunable lens' are used in the context of the present disclosure as alternatives for 'optical device'. Furthermore, in the context of the present application, the term 'radial direction' is used for a direction that extends radially from the optical axis of the Fresnel lens. A more specific implementation of 'radial' is 'lateral', which defines an orientation at or towards a lateral side of the lens foil and/or lens system.

Preferably, the method further comprises cutting the first and second transparent bodies and the at least one lens foil along a circumference of a cut-out region with a shape that corresponds to a shape of a frame wherein the electroactive lens is to be fitted.

Aligning may be performed using at least one alignment element and corresponding alignment holes in the first, second transparent bodies (i.e. first and second lens elements) and at least one lens foil. The alignment holes in the first and second transparent bodies and in the at least one lens foil may be each positioned in a portion of the respective first, second transparent bodies and at least one lens foil that is outside the cut-out region, i.e. the region or area of the lens system that is to be cut out (at least partially) so as to meet a desired shape of a spectacle frame or glass. Thereby the alignment holes may not affect the finished electroactive lens since the alignment holes may be situated at a position to be removed prior to finalization of a finished electroactive lens system. The alignment holes are particularly positioned using, for example, computer-implemented methods, which contribute to the accuracy. The at least one aligning element is for instance an alignment pin to be inserted into the alignment hole.

Rather than using alignment holes, alignment marks can be applied. Such alignment marks are optical structures defined in the elements during production, for example simultaneously with providing a shape to the first and the second transparent body. At least one of the conductive plugs may also be used as an alignment mark, i.e. by specifying a standardized distance between at least one of the conductive plugs and the optical axis of the electro-activated lens. Alternatively or additionally, an alignment mark may be generated in the at least one lens foil as a pattern in a conductive layer (preferably applied on the transparent electrode layer in one or more selected areas), or as an auxiliary conductive plug in an area laterally outside the cut-out region.

Preferably, a plurality of aligned holes or alignment marks is provided, so as to ensure alignment of the lens elements in all directions. For instance, using two alignment holes or alignment marks would fix the alignment in the radial direction and the angle of an element with respect to another element in the radial plane (i.e. parallel to the transparent electrodes). Optionally, the axial direction is fixed by other elements arranged adjacent (in the axial direction) to an element.

The correct mutual alignment of the first, second and at least one lens foils may vary for different users, as such. Preferably, the common optical axis corresponds to a pupil position of an eye of a user of the pair of glasses when the user looks into infinity. The optical axis of the optical device in the at least one lens foil corresponds to a pupil position of the eye of a user of the pair of glasses in a position wherein the user requires correction for presbyopia of the eye of the user. For instance, when the tunable lens is used for reading only, the axis can be horizontally positioned at the user's pupillary distance minus two to four millimeters to compensate for the eye's convergence. Vertically, the position is preferably set as low as possible in the frame.

The lens foil preferably comprises a first conductive layer provided on and electrically coupled to the first transparent electrode, and a second conductive layer provided on and electrically coupled to the second transparent electrode. Herein, the first and/or second conductive layer will have a greater thickness in the axial direction of the lens than the first and/or second transparent electrode, respectively. Due to the additional conductive layers provided on the electrodes a reliable electrical connection may be obtained while a modular design option is provided. Particularly, the conductive layer has an interface with the conductive plug. An interfacial area of the said interface is sufficiently large to ensure adequate contact, i.e. contact with acceptable low contact resistance and good reliability. When more than one optical device is present, each electrode is provided with a respective conductive layer.

Suitably, the conductor layer is absent in a functional area in which the Fresnel lens is present, since it is typically not or not fully transparent. According to preferred embodiments, the conductor layer is patterned in a plurality of patterns each having a comparatively small surface area (for instance in comparison to the size of a conductive plug). Therewith, the visual impact of the non-transparent conductive layer may be minimized. The shape of the conductor layer patterns is open to further design and optimization. The conductive layer may be elongated and/or recurrent in an area on the respective conductive area. The conductive layer may comprise one or more sub elements, thereby minimizing the visual impact on the lens-stack while the overall surface area of the conductive layer remains relatively large area. As a consequence, the risk that a perforation defining a conductive plug would be made without going through the conductive layer is significantly reduced. The one or more sub elements may be e.g. a plurality of rings, a striped-pattern, a mesh-like pattern, a repetitious pattern and the like, as long as the visual impact is relatively small (i e has relatively small dimensions in the plane perpendicular to the axial direction of the lens-stack). Examples of conductive patterns have been described in the non-prepublished application PCT/EP2018/082445 in the name of the Applicant, which is herein incorporated by reference.

A portion of the second and/or first transparent electrode may be removed in a region corresponding to the position of the first and/or second conductive plugs, respectively. The removal of a portion of an electrode opposing the electrode where a conductive plug is connected may prevent undesirable shorting between the electrodes. To this end, an extra electrical interruption may alternatively or additionally be provided in an opposing electrode in a region wherein a conductive plug is electrically coupled to an electrode. Such electrical interruption may be, for example, an etched away boundary line in the opposing electrode such that that the portion of the opposing electrode in the vicinity of the conductive plug coupled to the electrode is isolated from the remaining portion of the opposing electrode.

The lens foil may comprise at least one spacer disposed within the optical device. Such a spacer may maintain a fixed distance between the electrodes of the optical device under varying circumstances such as in the non-limiting exemplary circumstance wherein pressure would be applied on the electroactive lens in the axial direction thereof. In one implementation, a spacer is provided between the Fresnel lens and the opposed electrode. The spacer is preferably made of an optically transparent material. As the Fresnel lens typically comprises a plurality of concentric structures, it is feasible that the spacer is provided at a location where visual disturbance is minimized.

The lens foil may further comprise an optically transparent, electrically insulating material that is arranged laterally sidewise to the Fresnel lens and the liquid crystalline material. It therewith also is configured as a tube for the liquid crystalline material that is preferably provided in the form of a liquid or paste. Such electrically insulating material may include a structure configured for use as the spacer, but this is not necessary. In a preferred implementation, the electrically insulating material is made of the same material as the Fresnel lens, so as to reduce visual impact as much as possible. The at least one spacer may be disposed within the inner volume of the optical device. The electrically insulating material may extend into a connection area in which the one or more conductive plugs may be arranged, and may overlie the conductive layer if present. This material may be the same material as used in the functional area, and deposited simultaneously with the Fresnel lens structure, but may alternatively be a material that is deposited separately. Methods of manufacturing of the electro-activated lens have been described in EP3255479A1, which is herein incorporated by reference.

Preferably, the first and second substrate are flexible and made of polymer material. By further preference, the Fresnel lens structure and any electrically insulating material in the at least one lens foil also contain polymer material. Fillers and/or additives dissolved or dispersed therein are not excluded, notwithstanding a strong preference that the electro-activated lens is optically transparent. As discussed in the above mentioned application EP3255479, this allows that the at least one lens foil is thermoplastic in its entirety, implying that it can be bent to conform to a shape of an interface with the first lens element and/or the second lens element.

The first lens element used in the lens system may have a substantially flat surface, wherein the substantially flat surface of the first lens element may face the at least one lens foil, and wherein the second lens element may have a substantially flat surface, wherein the substantially flat surface of the second transparent body may face the at least one lens foil, and wherein the at least one lens foil may have two substantially parallel surfaces in the axial direction of the electroactive lens. Thereby the electroactive lens may be assembled in a modular manner.

Further, the first lens element may have a convex surface and the opposing substantially flat surface, wherein the substantially flat surface of the first lens element may face the at least one lens foil, and wherein the second lens element may have a concave surface and the opposing substantially flat surface, wherein the substantially flat surface of the second transparent body may face the at least one lens foil, and wherein the at least one lens foil may have two substantially parallel surfaces in the axial direction of the optical device.

The convex surface and/or substantially flat surface of the first lens element, and/or the concave surface and/or substantially flat surface of the second lens element may be pre-treated. The surfaces may be pre-treated prior to assembly of the electroactive lens. For example, any of these surfaces may be pre-treated with at least one of: a polarizing layer, polishing, an anti-reflection layer, and the like.

In the method of manufacturing, the at least one lens foil may be provided as a pre-produced element. Preferably the first and second transparent bodies may be provided as pre-produced elements.

At least one passivation layer may be present in a region of the lens system where conductive elements may be coupled to the conductive plugs. Thereby a smooth outer edge may be obtained which may be preferable from a user-perspective. Further, this may also be preferred from an device-perspective since the passivation layer may reduce negative optical effects due to the steps required for the coupling of the electrical connections such as, for example, the creation of optical interfaces between materials of different refractive indices. To this end, the passivation layer is preferably formed by a material having similar optical properties as the first and/or second lens elements.

In some embodiments the first transparent body is connected to the second transparent body with an adhesive. More particularly, adhesive may extend along the at least lens foil from the first to the second transparent body. The adhesive can therein be present, for instance, in a glue channel through the at least lens foil and/or along at least part of a peripheral edge of the at least one lens foil. It has turned out that such adhesive connection improves the overall rigidity and mechanical stability of the lens system. Particularly, due to the presence of one or more layerwise constructed lens foils between transparent bodies, shear forces work on layers within the one or more lens foils or between two lens foils (in case of more than one lens foil). Such forces are counteracted in an effective manner by means of the adhesive connection.

Preferably, the adhesive connection is present in addition to adhesive on opposed main faces of the at least one lens foil. Due to the adhesive which is present in between the first transparent body and the second transparent body, the first lens element and the second lens element do not have to be coupled with e.g. screws and nuts to join the two elements. The visual impact on the lens elements may therefore be relatively small. In order to both apply the adhesive on a main face and to apply the one or more adhesive connections, adhesive is preferably applied in liquid form, for instance as a paste, as a dispersion or as a solution. More preferably, the adhesive is dispensed along the peripheral edge and/or in glue channels. However, it is not excluded that the adhesive is provided onto a main face of the lens foil and thereafter flows over the lens foil along the edge and/or into the glue channels. For such flow, it is not excluded to increase the temperature so as to reduce viscosity of the adhesive.

In an advantageous embodiment, the lens foil is cut out into a predefined shape, wherein the said shape includes glue channels along one or more portions, which are subsequently to form a peripheral edge of the lens foil. Portions of the lens foil that are located at the other side of such glue channels than the Fresnel lens can thereafter be removed, so that an adhesive connection will be located along a peripheral edge of the at least one lens foil. The removal of said portions may for instance be carried out in a removal step in which the entire lens system (thus transparent bodies and intermediate lens foil(s)) is provided with a desired shape. However, alternative ways of removing such portions are not excluded.

Preferably, the cutting out into a predefined shape, which is also referred to as edging, is performed prior to the providing of the at least one lens foil on the first transparent body. The partial removal of the at least one lens foil may thereby result in one or more gluing channels extending along the axial direction of the at least one lens foil and that may be configured to receive an adhesive. Thereby the first and second transparent bodies may be integrally connected, thereby sandwiching the at least one lens foil in between the first and second transparent bodies.

Preferably only some connection portions remain in a region wherein the adhesive is applied, thereby sealing the switchable lens from the outside. Preferably, the connection portions are relatively small, e.g. only 25%, preferably 5%, more preferably 1%, even more preferably <1% of the total peripheral edge of the at least one lens foil is formed by such connection portions while the remaining portion of the peripheral edge of the at least one lens foil is formed by the adhesive. Further, in some embodiments the at least one lens foil may be fully bordered by the adhesive. Thereby the switchable lens may be sealed from external conditions.

In a further implementation, the said connection portions outside of the cut-out region are advantageously used during the assembly process, for instance for alignment and/or for placement and gripping by equipment that may damage the at least one foil. The alignment for instance occurs with alignment holes. After the assembly, such connection portions may be removed.

In another embodiment, the lens foil is cut out into a predefined shape including glue channels, extending between first and second foil parts. However, the predefined shape is such that the glue channels will not become part of a peripheral edge of the lens foil.

For the joining of the first and second transparent bodies by means of adhesive, notwithstanding the presence of at least one lens foil in between thereof, it is a preferred option to provide gluing channels through the at least one lens foil, which are to be filled with adhesive. It is deemed practical to apply an adhesive that is curable by UV-radiation, but heat-curing is not excluded. More preferably, such adhesive is applied in the form of a paste or even foil into the gluing channels. The adhesive may be applied before assembly or after assembly of the at least one lens foil to first transparent body. An adhesive that becomes sticky at gentle heating, such as for instance an adhesive based on EVA (ethylene vinyl acetate) is deemed advantageous, when applying it before assembly. Such behavior allows temporary fixation of the adhesive without which the adhesive would run away. It is furthermore possible that the gluing channel is provided with an entry port arranged sidewise, through one of the transparent bodies or in the lens foil. This facilitates application of the adhesive after assembly. When such channels extend sidewise, the visual impact is likely minimized, as the channels do not enter a functional area of the device, i.e. the area wherein the optical device is defined as opposed to the connection area in which the conductive plugs are provided.

The removal of portions of the first and/or second transparent body and/or the at least one lens foil is for instance performed by drilling and/or milling. The same technology may be applied for the edging of the first and second transparent body and the at least one lens foil to the cut-out region to a shape that corresponds to the shape of a frame wherein the lens is to be fitted.

The pair of glasses may further comprise a controller for controlling a signal for switching the LC-material within the optical device between at least a first and a second state. Wherein in the first state the refractive index of the LC-material (in the axial direction of the lens-stack) may substantially match the refractive index of the Fresnel element and in the second state the refractive index of the LC-material (in the axial direction of the lens-stack) may be different from the refractive index of the Fresnel lens element. The first optical axis may correspond to a pupil position of an eye of a user of the pair of glasses when the user looks into infinity. The second optical axis may correspond to a pupil position of the eye of a user of the pair of glasses in a position wherein the user may require correction for presbyopia of the eye of the user.

Further characteristics of the present disclosure will be elucidated in the accompanying description of various exemplifying embodiments thereof. In the description reference is made to the annexed figures.

According to a further aspect, the disclosure relates to a mutually attached stack of a first and a second lens foils each comprising a first substrate with a first transparent electrode, a second substrate with a second transparent electrode, and a Fresnel lens and liquid crystalline material between said transparent electrodes, wherein said transparent electrodes, said Fresnel lens and said liquid crystalline material define an optical device. Herein each lens foil further comprises first and second conductive plugs extending through the lens foil. The conductive plugs may have a plug axis extending substantially perpendicular to the transparent electrode. The mutual attachment means that the first and second lens foils are not just separate entities, but that these are combined into a single intermediate product.

The stack has the benefit that it serves integration of an electro-active, refocusable lens into spectacles. The conductive plugs facilitate contacting after integration with the transparent bodies, typically lens halves, already because the conductive plug are well visible. Moreover, it is feasible to expose the conductive plugs from any side, i.e. front, bottom or lateral, dependent on design, among others. Furthermore, these conductive plugs are preferably arranged in a connection area outside a lens area in which the Fresnel lenses of the lens foils and any lens elements of the transparent bodies are located. As such, the visual disturbance is limited to a minimum. Such a stack and the lens foils therein may have any of the preferred embodiments and implementations discussed hereinabove with reference to the first aspect. For instance, the liquid crystalline material of the first and second lens foil is preferably nematic liquid crystalline material, and wherein the optical device of the first lens foil is oriented at a 90 degrees angle relative to the optical device of the second lens foil, so as to avoid birefringence.

In an embodiment, the conductive plugs of the first and second lens foils are oriented such that the axis of the first conductive plugs of both lens foils are aligned, and wherein the said first conductive plugs are mutually electrically connected. In a further embodiment, the axis of the second conductive plugs of both lens foils are aligned, and wherein the said second conductive plugs are mutually electrically connected. As stated, this is beneficial for alternative current driving of the optical devices.

It is also beneficial that the first and second conductive plug are positioned relative to the optical axis of the Fresnel lens such that radial lines extending from the optical axis to the first and second conductive plug mutually enclose an angle of less than 120 degrees, preferably less than 90 degrees, more preferably less than 60 degrees.

The disclosure furthermore relates to the use of such a stack in an electroactive lens system. Most preferably, the lens system forms a stack of at least three elements, wherein the said stack is sandwiched between a first transparent body and a second transparent body, wherein the first and second conductive plugs of the lens foils have a plug axis extending substantially perpendicular to the transparent electrode, via which conductive plugs the lens is electrically coupled to a conductive element extending to outside the said stack.

Preferably, the said conductive plugs are provided with an axial surface at which auxiliary conductive material is present, to which the said conductive element is connected, wherein said auxiliary conductive material extends within a channel that is arranged either vertically or laterally. The further details hereof have been explained and discussed hereinabove and will be further elucidated with reference to the figures, and are deemed also included with respect to this embodiment of this aspect of the disclosure.

In again a further aspect, the disclosure relates to an electroactive lens system, the lens system forming a stack of at least three elements, of which at least one lens foil is sandwiched between a first transparent body and a second transparent body, and wherein the at least one lens foil comprises a first substrate with a first transparent electrode, a second substrate with a second transparent electrode, and a Fresnel lens and liquid crystalline material between said transparent electrodes, wherein said transparent electrodes, said Fresnel lens and said liquid crystalline material define an optical device, wherein the first and second transparent electrodes are each electrically coupled to a conductive element extending outside the lens system, wherein the lens foil further comprises first and second conductive plugs extending through the lens foil, which conductive plugs have a plug axis extending substantially perpendicular to the transparent electrode and each of which conductive plugs is provided with an axial surface extending at least largely parallel to the plug axis, at which axial surface the conductive plugs each contact auxiliary conductive material that is connected to a conductive element extending outside the said stack, wherein the auxiliary conductive material extends laterally from said axial surface within a conductor channel in which preferably also a part of the conductive element is present.

Such a system may be manufactured in a method comprising the steps of:
providing the at least one lens foil onto the first transparent body;
providing the second transparent body onto the at least one lens foil;
generating at least one axial surface extending at least largely parallel to the plug axis in the first and second conductive plugs, providing auxiliary conductive material that contacts directly said at least one axial surface of the conductive plug and is connected to a conductive element configured for transmission of a voltage for operating the switchable lens, therewith electrically coupling the first and second transparent electrodes to conductive elements, wherein the step of generating the axial surface comprises generating an aperture into the at least one lens foil, said aperture extending into the first and/or second transparent body, being oriented laterally relative to the plug axis and terminating into the first or second conductive plug, thus defining the axial surface, wherein preferably the conductive element is provided partially into said aperture, thus forming a conductor channel, and is connected to the conductive plug by means of the said auxiliary conductive material.

The use of lateral connections to the lens foil via the conductive plugs has turned out a very practical approach to assembly. It is particularly preferred in combination with the locations of the conductive plugs on one side of the lens foils, as this allows assembly from one side.

According to a still further aspect, a method of manufacturing an electroactive lens system is provided, as well as such a lens system obtainable with the method. As expressed hereinabove, the lens system forms a stack of at least three elements, the stack comprising a first transparent body, a second transparent body and at least one lens foil in which lens foil an optical device is defined, typically having an optical axis. The lens foil comprises a first substrate with a first transparent electrode and a second substrate with a transparent electrode, in between of which transparent electrodes a Fresnel lens and liquid crystalline material are present, which electro-activated lens further comprises first and second conductive plugs extending through the electro-activated lens, which conductive plugs have a plug axis extending substantially perpendicular to the transparent electrode. The method comprises the steps of (1) providing the at least one lens foil onto the first transparent body; (2) providing adhesive onto the at least one lens foil (3) providing the second transparent body onto the at least one lens foil. Herein, the said adhesive is arranged between the at least one lens foil and the second transparent body. Said at least one lens foil is provided with at least one glue channel extending through the lens foil, so as to extend, after manufacturing, from the first transparent body to the second transparent body. Adhesive is provided into said glue channel and is cured to constitute an adhesive connection.

Additionally or alternatively, the at least one glue channel is arranged outside an area in which the optical device is defined. This area typically is a connecting area in which the conductive plugs are present as well. In this manner, the functional, i.e. lens area is not comprised.

In an advantageous embodiment, the method further comprises the step of modifying a shape of the electroactive lens system such that the glue channel filled with adhesive becomes a portion of a peripheral edge of the at least one lens foil. This modification typically entails the removal of outside portions.

Additionally or alternatively, at least one connection region is present extending from a cut-out region defined by at least one glue channel outwards away, from the area in which the optical device is defined. This connection region extending outside the cut-out shape may for instance be exploited for alignment. In this situation, the method further comprises the step of aligning the at least one lens foil to at least one of the first and the second transparent body and/or a further lens foil, by means of an alignment means in the connection region, wherein the alignment means for instance is at least one alignment hole.

It is observed that any explanation given hereabove in relation to one aspect also applies to another aspect. Moreover, any embodiment specified in relation to one aspect is also applicable to another aspect, unless the opposite is expressed.

BRIEF DESCRIPTION OF THE DRAWINGS

Further details of the present disclosure follow from the following description of a few embodiments of the present disclosure. In the description reference is made to the annexed figures, in which show:

FIGS. 1A and 1B are front views of a spectacle frame comprising an electroactive lens and electric connections coupled thereto;

FIGS. 4A, 4B, 4C, 4D illustrate a method of producing an electroactive lens system;

FIGS. 5A, 5B. 5C, 5D illustrate a method of producing an electroactive lens system;

DETAILED DESCRIPTION OF ILLUSTRATED EMBODIMENTS

Figure 2A:
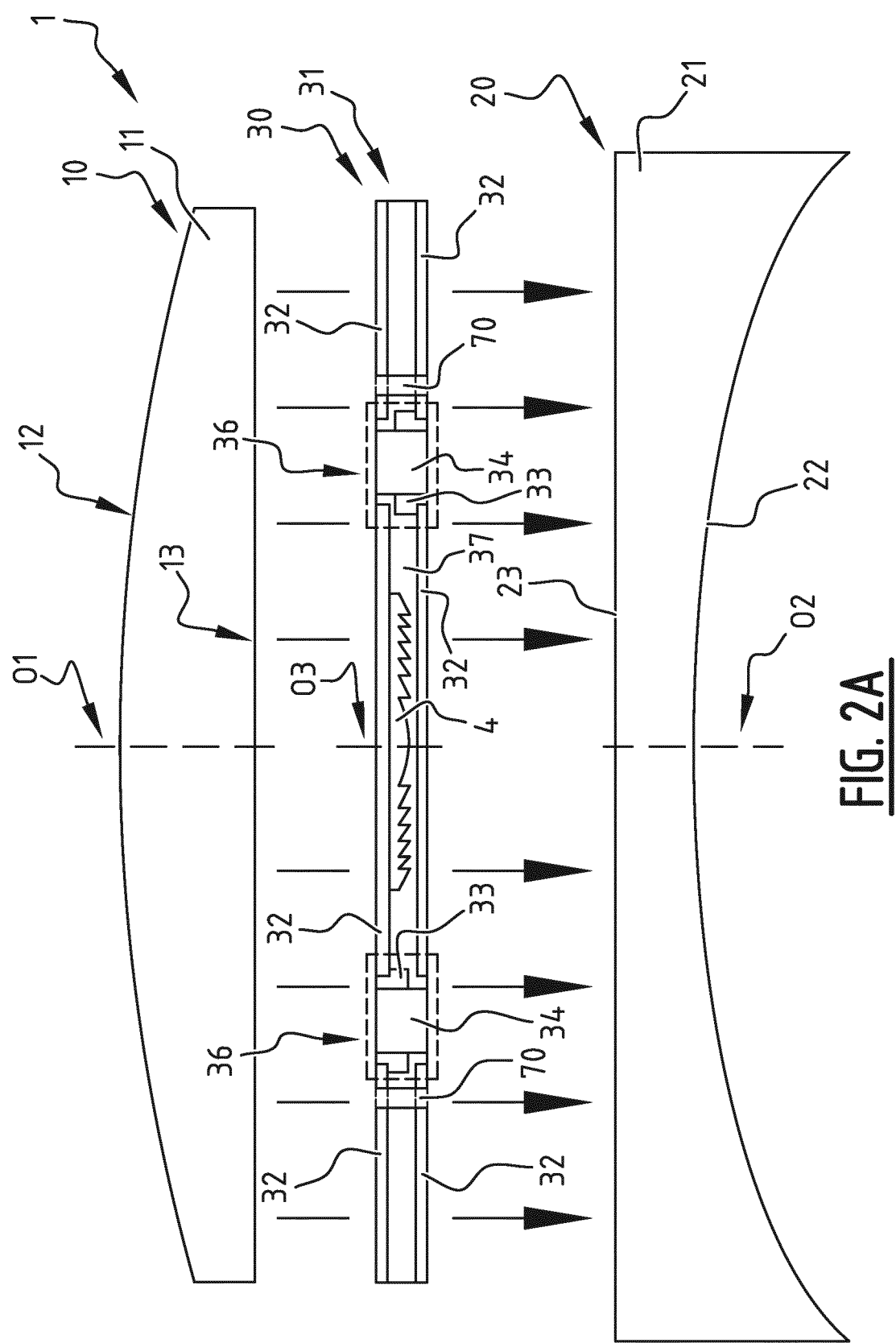
FIG. 2A shows a method of integrating an optical device into two lens elements.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily obscuring the present disclosure.

As will be apparent to those of skill in the art upon reading this disclosure, each of the individual embodiments described and illustrated herein has discrete components and features which may be readily separated from or combined with the features of any of the other several embodiments without departing from the scope of the present disclosure. Any recited method can be carried out in the order of events recited or in any other order which is logically possible.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. The terms 'transparent body' and 'lens element' will be used for reference to the said element, in that in accordance with the illustrations, the transparent bodies are embodied as lens elements. Similarly, the description refers to both the lens foil and the optical device with the same reference numeral. Strictly speaking, the optical device is the optical functionality (such as a lens) defined in the lens foil.

FIGS. 1A and 1B are front views of a pair of glasses comprising a spectacle frame 2. In the spectacle frame 2 electroactive lenses 1 are arranged. The electroactive lenses 1 are configured to correct the sight of a user of the pair of glasses. For example, a user may suffer from presbyopia and may therefore need visual aids for seeing a clear image. For some users of spectacles, a single optical strength may be insufficient and the spectacles may require, for example, bifocal lenses. In contrast to ordinary bifocal lenses, the electroactive lenses may provide two optical strengths within one lens. The optical strength of the electroactive lens may be electronically altered by applying a voltage over the electric connections 8 as will be explained later. This allows the optical power of a Fresnel lens-structure 4 to be added to the optical power of the electroactive lens 1.

Due to the production method of the present disclosure the design options for the production of a pair of glasses comprising electroactive lenses 1 is greatly increased. For example, the position of the electronic connections 8 may be varied over a relatively large region of the electroactive lens 1, for example, the connections 8 may be placed on the sides of the electroactive lenses 1 as in FIG. 1A. Alternatively, the connections may be placed on the top of the lenses as in FIG. 1B. However, the positions are not limited to the examples provided by FIGS. 1A and 1B. The ability to vary the position of electronic connections 8 allows the electroactive lenses 1 to be integrated into many different frames 2 without having to alter the production method. The visual impact of the electric connections 8 may also be reduced by appropriately positioning the electric connections 8 in areas of the electroactive lens 1 that are rarely used by the user such as on the sides, top, and/or bottom thereof depending on the spectacle frame.

Further, the position of the Fresnel lens-structure 4 may also be varied by the production method discussed later. Thereby the optical axis of the electroactive lens 1 and the optical axis of the Fresnel lens 4 may be appropriately positioned relative to the pupil position 3 of a user depending on the requirements of the user.

FIG. 2A shows a method of integrating an optical device into two lens elements to thereby obtain the electroactive lens 1. The electroactive lens 1 comprises at least three elements after assembly. The first transparent body 10 is a first lens element 11. The first lens element 11 may be made of an optically transparent material having a curved surface 12 and a flat surface 13, wherein the curved surface 12 is preferably convex. The first lens element 11 has a first optical axis O1. The second transparent body 20 is a second lens element 21. The second lens element 21 may be made of an optically transparent material having a curved surface 22 and a flat surface 23, wherein the curved surface 22 is preferably concave. The second lens element 21 has a second optical axis O2. In the example of FIG. 2A the first optical axis O1 and the second optical axis O2 are aligned on a common optical axis. The first lens element 11 and the second lens element 21 provide a first optical power of the electroactive lens 1.

In between the first transparent body 10 and the second lens element 20, a at least one lens foil 30 is placed. The at least one lens foil 30 is a optical device 31 such as an optically switchable lens, said optically switchable lens 31 being configured to be activated using a voltage provided to at least two optically transparent electrodes 32. Said electrodes 32 may be, for example, tin-doped indium oxide (ITO) layers and/or indium-zinc oxide (IZO) layers. In between the electrodes 32, a liquid-crystal (LC) layer is arranged. The LC-layer may comprise, for example nematic and/or cholesteric liquid crystals. These liquid crystals are provided in an enclosed volume 37 enclosed within a border (not shown) and said electrodes 32. The border preferably comprises at least partially the same material as the Fresnel lens, so as to minimize visual disturbance. It is deemed preferably to apply adhesive at a top side of the border, so as to ensure that the second substrate and the first substrate of the lens foil are fixated, such as discussed in EP3255479A1. In addition the optical device 31 comprises a Fresnel-lens structure 4. Within the volume 37, one or more spacers may be arranged. The spacers may be arranged between the Fresnel lens 4 and an opposing electrode 32, and/or the spacers (not shown) may be arranged in between the electrodes 32. The electrodes 32 are configured to alter the alignment of the liquid crystals thereby altering the refractive index of the LC-layer in the axial direction of the electroactive lens 1. Thereby a change in optical power of the at least one lens foil 30 may be obtained.

For example, in a first state, no voltage is applied to the electrodes 32. In this first state the refractive index of the liquid crystals, in the axial direction of the electroactive lens 1, matches the refractive index of the Fresnel lens 4 i.e. a passive lens 4. Thereby, the Fresnel lens 4 and the LC-layer effectively form an optical layer of the same refractive index having two parallel surfaces (in the axial direction of the at least one lens foil 30). Therefore a ray of light, incident on the electroactive lens 1 will not be collimated or dispersed by the at least one lens foil 30. Said ray will be refracted by the optical power provided by the first lens element 11 and the second lens element 21. However, in a second state, when a voltage is applied to the electrodes 32, the liquid crystals are aligned due to the electric field generated between the electrodes 32. Due to this alignment, the refractive index of the LC-layer in the axial direction of the at least one lens foil 30 is altered, thereby inducing an optical interface between the liquid crystals and the Fresnel lens 4 having a different refractive index than the liquid crystals. Due to the optical interface, a ray incident on the lens element 1 will be refracted by the at least one lens foil at the optical interface between the Fresnel lens 4 and the LC-layer, thereby collimating or dispersing a ray incident on the Fresnel lens 4. This will provide additional optical power to the electroactive lens 1 in addition to the first optical power provided by the first lens element 11 and the second lens element 21. Alternatively, the first state may be a state wherein a voltage is applied to the electrodes 32 and in the second state no voltage is applied to the electrodes 32, where the refractive index of the LC-layer in the axial direction of the electroactive lens 1 respectively matches and differs from the refractive index of the Fresnel lens 4.

For the following description, a switched on state refers to a state wherein additional optical power is provided to the electroactive lens 1 by creating a refracting optical interface between the Fresnel lens 4 and the liquid crystals in the volume 37, while the switched off state refers to a state wherein the refractive index of the liquid crystals in the axial direction of the electroactive lens 1 matches the refractive index of the Fresnel lens 4 as a result of which, no additional power is provided to the electro active lens 1 other than the first optical power provided by the first lens element 11 and the second lens element 21. Preferably the refractive index of the LC-layer (in the switched of state) and Fresnel lens 4 matches the refractive index of the first lens element 11 and the second lens element 21.

In the switched on state, additional optical power is provided in a region corresponding to the region wherein the Fresnel lens 4 is present. The Fresnel lens 4 may be an positive Fresnel lens or a negative Fresnel lens, preferably, the Fresnel lens 4 is a negative Fresnel lens. In the example of FIG. 2A, a third optical axis O3, being the optical axis of the Fresnel lens 4, coincides with the first optical axis O1 and the second optical axis O2. However, although the first optical axis O1 and the second optical axis O2 are aligned on a common optical axis, the third optical axis O3 may or may not coincide with the common optical axis. The third optical axis O3 is arranged with respect to the common optical axis depending on the needs of the user. The additional lens power due to the at least one lens foil 30 may only be present in the switched on state, hence, the third optical axis O3 may correspond to a lens action only in the switched on state. However, the third optical axis O3 corresponds to the optical axis of the Fresnel lens 4 irrespective of the state of the at least one lens foil. It may differ among users what kind of Fresnel lens 4 is used, for example, different sizes, strengths, shapes of Fresnel lenses 4 may be used and the Fresnel lens 4 may be positive or negative depending on the needs of the user. The Fresnel lens 4 may be positioned on either of electrodes 32 and may be formed thereon by nanoimprint lithography.

The first transparent body 10, second transparent body 20 and at least one lens foil 30 are preferably pre-produced elements that are assembled to form the electroactive lens 1. In the assembly process, the position of the at least one lens foil 30 relative to the first transparent body 10 and the second transparent body 20 may be aligned such that the optical axis O3 is positioned relative to the common optical axis in a manner that corresponds to the requirements of the user of the electroactive lens 1. The first transparent body 10 and the second transparent body 20 are joined by applying an adhesive between the two elements. To this end, the at least one lens foil 30 comprises glue channels 70 through which an adhesive joining the first transparent body 10 and the second transparent body 20 is to be applied. The adhesive may for example be UV-curable acrylate-type adhesives such as NOA74 or NOA164.

In order to electrically couple the electrodes 32 to a voltage source (not shown) preferably mounted near, on and/or in the spectacle frame 2 several electric connections 8 are present. The electric connections 8 comprise a conductive layer 33 and a conductive plug 34. The conductive plug 34 has a plug axis 55 and is preferably arranged such that said plug axis 55 is substantially perpendicular to the upper surface of the lens element 21 and/or to the lower surface of the lens element 11. Furthermore the plug 34 has a thickness in the axis direction of multiples times the thickness of the electrode 32, for instance 20-50 times the electrode thickness. The conductive layer 33 is provided on each electrode 32 since the electrodes 32 may have a relatively small thickness, for example in the order of 100 nm, therefore, establishing a reliable electrical connection (without the conductive layer 33) between the electrode 32 and a conductor (or conductive plug 34) may be difficult. For example, when the conductor is provided through the electrode 32 in the axial direction of the electroactive lens 1, the conductor may only have 100 nm to couple over with the electrode 32. Therefore, to increase the connection thickness, a conductive layer 33 is provided on the electrode 32. Thereby, the conductive layer 33 increases the thickness available for electrically coupling such a conductor to the electrode 32. In other words, due to the conductive layer 33, the total area where an electric connection is established between the electrode 32 and a conductor (or conductive plug 34) is increased since current is allowed to flow from a conductor (or conductive plug 34) via the conductive layer 33 to the electrode 32. To this end, the conductive layer 33 preferably has a thickness greater than the thickness of the electrode 32.

Further the conductive layer 33 may be provided with conductive plugs 34 that are provided to be in electrical contact with the conductive layer 33 and may suit as a basis whereto terminals may be electrically coupled. In accordance with one aspect of the disclosure, as disclosed in FIG. 11, the first and second conductive plug 34 mutually enclose an angle of less than 120 degrees, preferably less than 90 degrees, for instance at most 60 degrees, relative to an optical axis through the Fresnel lens. In other words, as clearly shown in FIG. 11, the conductive plugs 34 for a single lens foil or a stack of lens foils are arranged at the same side. When seen in a direction parallel to the optical axis, and when arranging the lens foil in a manner such as to be integrated into spectacles, the conductive plugs are arranged laterally, rather than at a location below or above the optical axis. The conductive plugs may be mutually arranged in a manner that is efficient for the assembly. For instance, the conductive plugs may be arranged on a line. In case of more than two conductive plugs, they could alternatively be arranged in the form of a small array.

The conductive layer 33 may be a continuous layer formed by a conductive glue such as e.g. a silver ink paste. However, it is further preferred if the conductive layer 33 is formed such that the visual impact on the electro active lens 1 is minimized. This may be achieved by shaping the conductive layer 33 to be a mesh-like layer, a layer with one or more holes, a layer comprising a plurality of sub-layers adjacently arranged, any combination thereof and the like.

In order to reduce the risk of shorting the electrodes 32 to each other via the conductive plug 34 and/or conductive layer 33, a region of the electrode that is arranged on the opposite site of the at least one lens foil 30 may be removed in the connection region 36. For example, in a connection region 36 wherein a lower electrode is coupled to a conductive layer 33 and a conductive plug 34 corresponds to a region of an upper electrode on the opposite side of the at least one lens foil 30. The upper electrode and lower electrode are configured to receive different voltages, therefore electrical connection between the two should be prevented. To this end, the upper electrode 32 is removed in the connection region 36 wherein the conductive layer 33 and a conductive plug 34 are coupled to the lower electrode 32.

The connection region 36 may be chosen such that the electrical connections 8 are in a position of the spectacle frame 2 that minimizes the visual impact on the electroactive lens 1 as explained in the light of FIGS. 1A and 1B. The connection region 36 may only be a relatively small portion of the electroactive lens 1 in a front view of the lens such as in FIGS. 1A and 1B. As a consequence, the removal of a portion of an opposing electrode in the connection region (explained above) may only be a relatively small portion of said opposing electrode 32.

The description above relating to FIG. 2A applies to the following figures where appropriate, to not obscure the present disclosure, this description is not repeated for some of these figures although the same description may apply thereto.

Figure 2B:
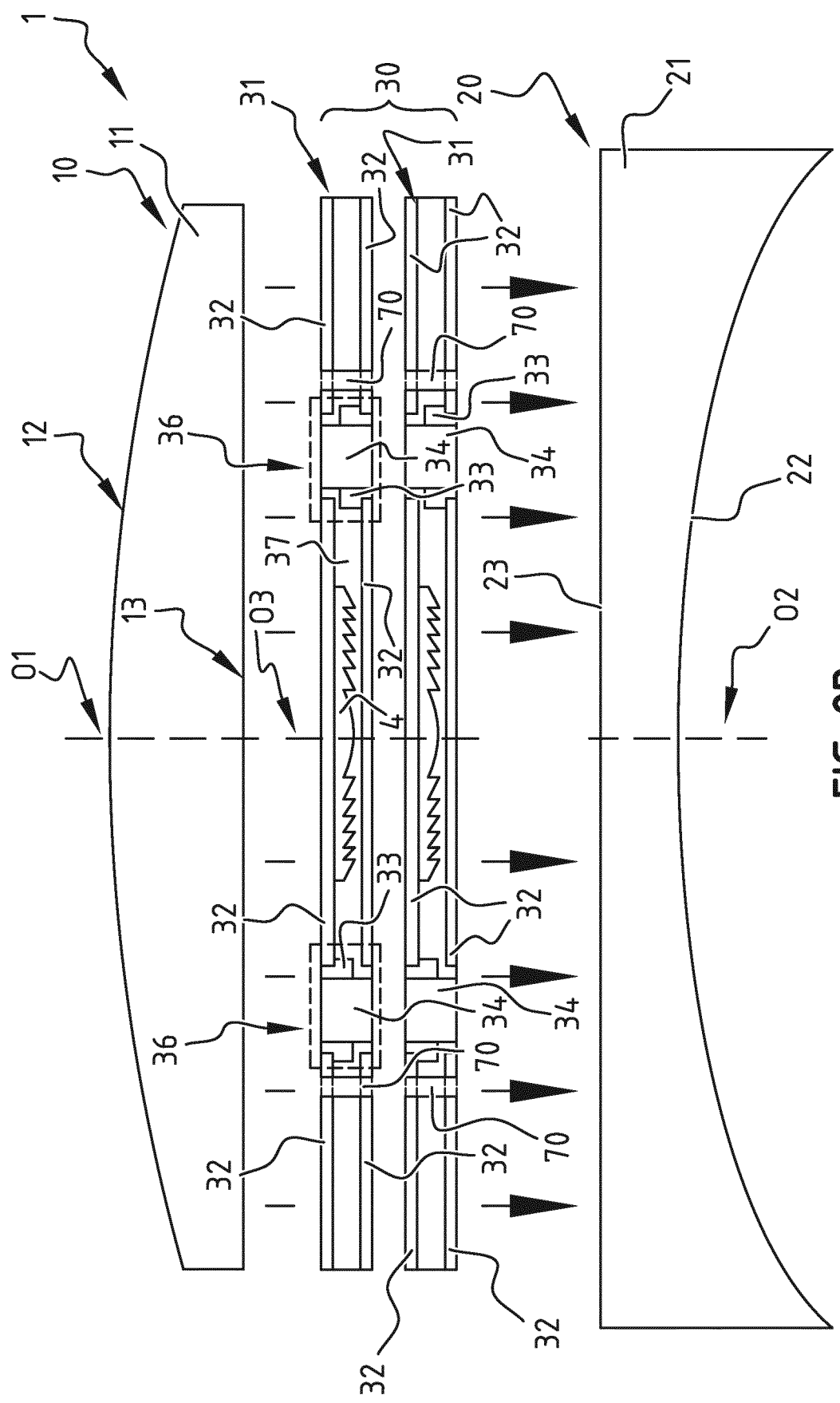
FIGS. 2B and 2C show a method of integrating more than one lens foils between two transparent bodies embodied as lens elements.
Figure 2C:
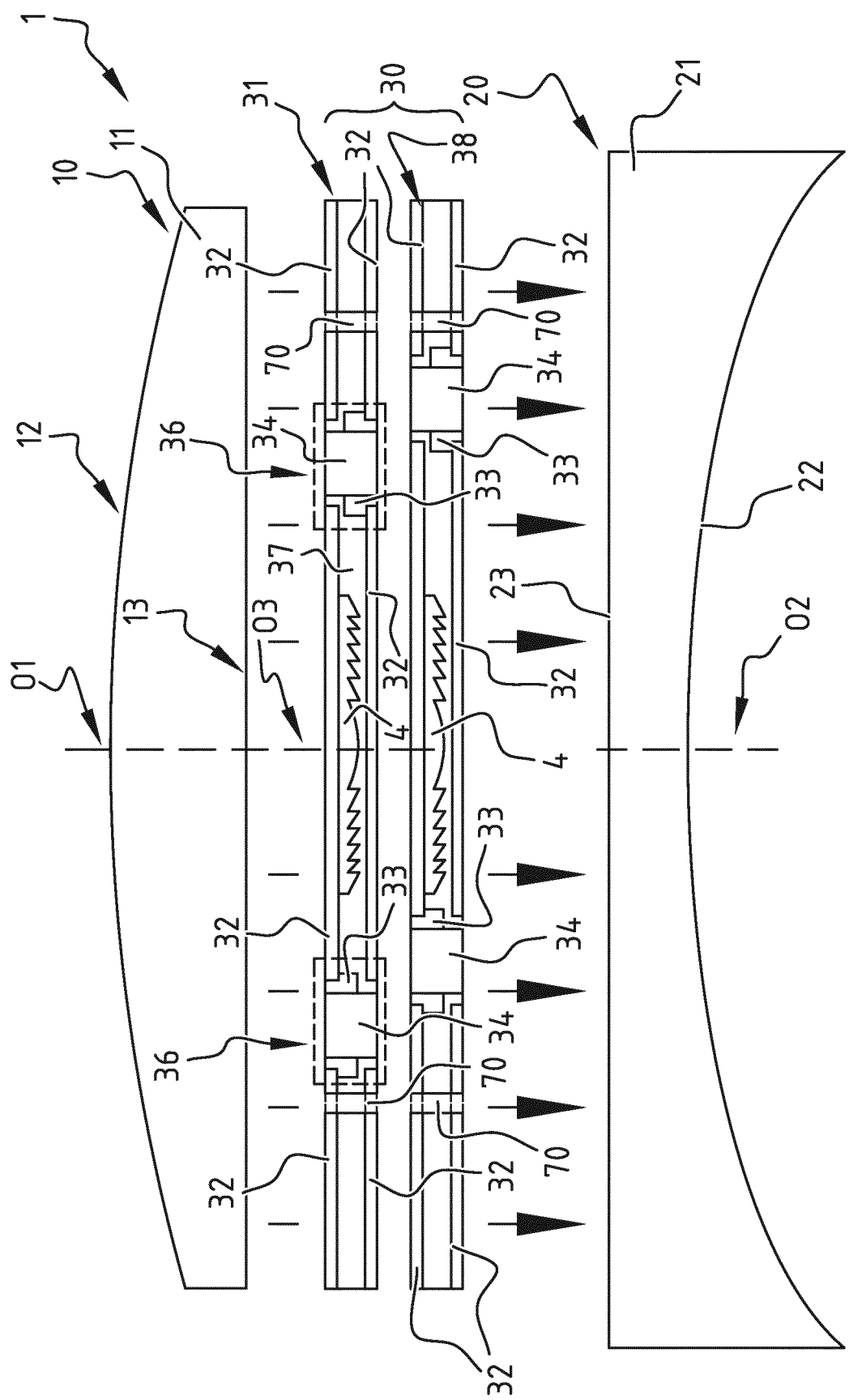

FIGS. 2B and 2C show a method of integrating more than one lens foil 30 into two lens elements, in accordance with a further aspect of the disclosure. The at least one lens foil 30 in FIGS. 2B and 2C comprises two optically switchable lenses 31, however the present disclosure is not limited thereto. In FIGS. 2A and 2B, the Fresnel lens 4 is illustrated on the upper electrodes of the optical devices 31, however the present application is not limited hereto. For example, the Fresnel lenses 4 may both be arranged on a lower electrode of respective optically switchable lenses 31. Alternatively one of the Fresnel lenses 4 may be arranged on an upper electrode 32 while another Fresnel lens 4 is arranged on a lower electrode 32 of respective optically switchable lenses 31. For example, a first Fresnel lens 4 may be arranged on the upper electrode 32 of an upper optical device 31 while a second Fresnel lens 4 is arranged on the lower electrode 32 of a lower optical device 31, 38 and vice versa.

In FIG. 2B the conductive plugs 34 of the lens foil 30 are arranged beneath one another in the axial direction of the electroactive lens 1. More particularly, the conductive plug 34 in electrical contact with the lower electrode 32 of the lower optically switchable lens 31, may be arranged beneath the conductive plug 34 in electrical contact with the lower electrode 32 of the upper optically switchable lenses 31. Likewise the conductive plug 34 in electrical contact with the upper electrode 32 of the lower optically switchable lens 31, may be arranged beneath the conductive plug 34 in electrical contact with the upper electrode 32 of the upper optically switchable lenses 31. Thereby, when coupling terminals to the conductive plugs 34 (explained later), a conductor can efficiently be coupled to both the conductive plugs that are arranged below each other because only one conductor may be required to provide both the lower electrode 32 of the lower optically switchable lens 31 and the lower electrode 32 of the upper optically switchable lens 31 with the same voltage. Likewise one conductor can provide both the conductive plugs that are arranged below each other because only one conductor may be required to provide both the upper electrode 32 of the lower optically switchable lens 31 and the upper electrode 32 of the upper optically switchable lens 31.

FIG. 2C comprises the same elements as FIG. 2B. However, in FIG. 2C the conductive plugs 34 of the upper optical device 31 and the lower optical device 38 forming the at least one lens foil 30 are not arranged beneath each other in contrast to FIG. 2B. This can be beneficial if independent control of the optical devices 31, 38 is required.

Although the illustrative embodiments of FIGS. 1, 2A, 3A, 4-11 show only one lens foil 30, two or more lens foils 30 may be used in these embodiments.

Figure 3A:
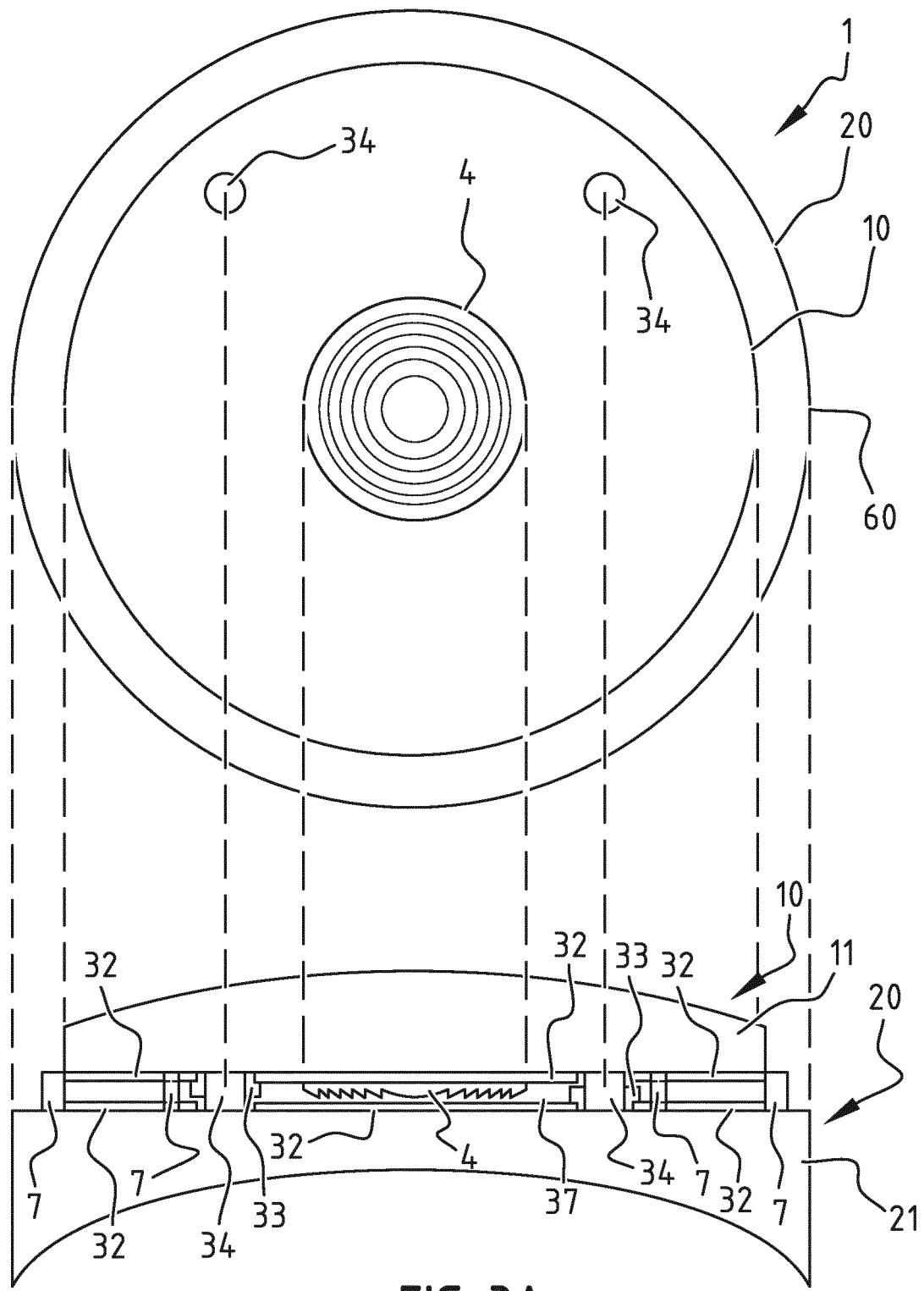
FIGS. 3A and 3B each show a lens stack from a side and top view.
Figure 3B:
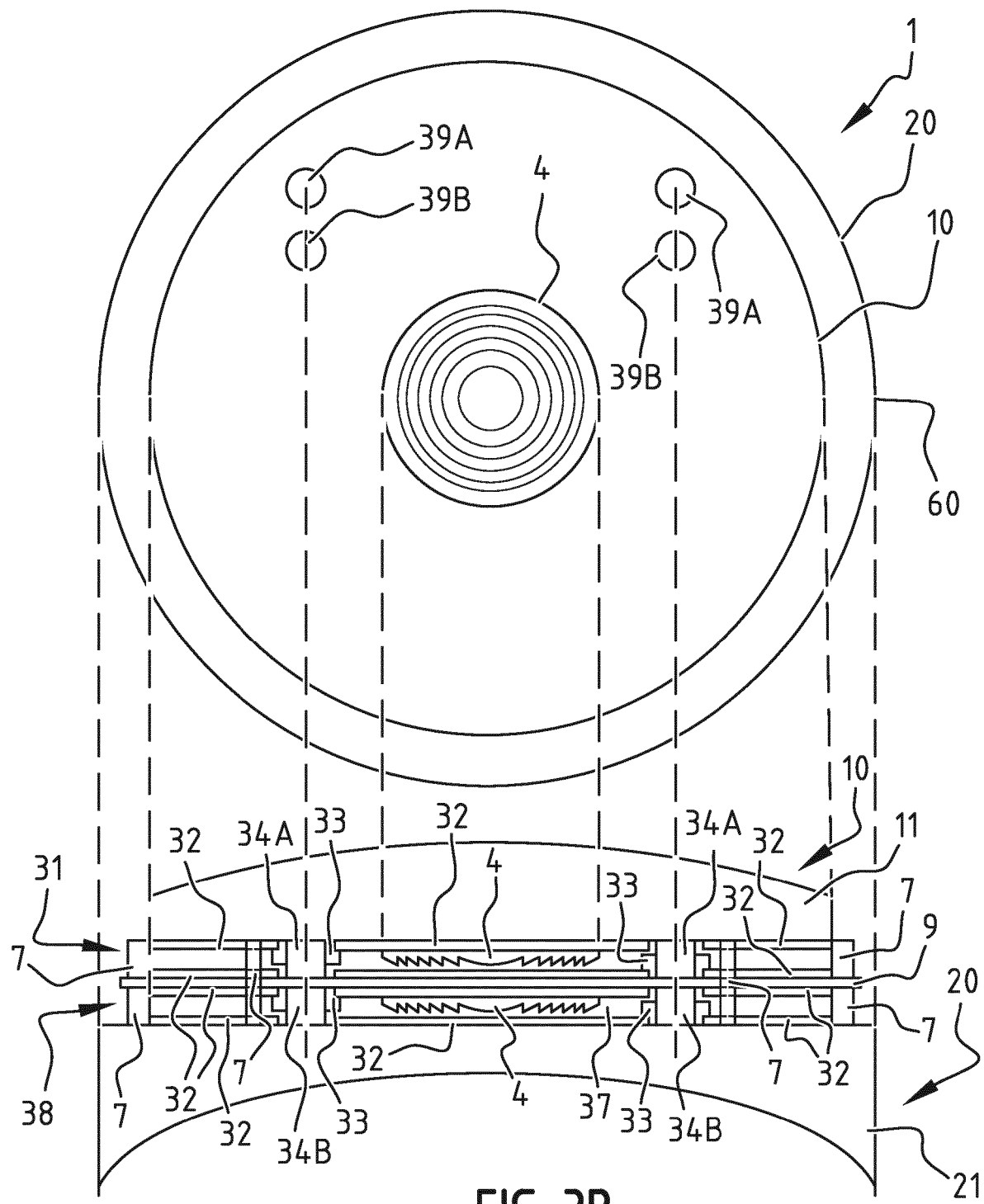

FIGS. 3A and 3B each show a lens stack from a side and top view. As is apparent from FIG. 3A, the lens stack formed by the elements discussed in the light of FIG. 2A is an unfinished stack. The circular shape of the electroactive lens 1 as in FIG. 3A (top view), will be edged as will be discussed later in order to fit the spectacle frame 2.

FIG. 3A is an exemplary view of the position of the components of the electroactive lens 1. After joining the components as in FIG. 2A, the first transparent body 10 and the second transparent body 20 are joined by an adhesive 7 applied in the glue channels 70. In addition the peripheral edge of the at least one lens foil 30 may be bordered by an adhesive 7. In this example, the Fresnel lens 4 is centered in the electroactive lens 1 and the conductive plugs 34 are situated in outer positions of the electroactive lens 1 (as apparent from the top view). After edging this electroactive lens 1 the electroactive lens 1 as in FIG. 1A may be obtained. Prior to edging, the first transparent body 10 and the second transparent body 20 may have circular shapes as shown in the top view. The first transparent body 10 and second transparent body 20 may have similar or the same diameter. In the example of FIG. 3A, the diameter of the second transparent body 20 is illustrated as being slightly larger than the diameter of the first transparent body 10. The outer edge 60 of the entire unfinished electroactive lens 1 is thereby defined by the outer edge of the second transparent body 20. Due to the adhesive 7 the at least one lens foil 30 is sealed from the environment to ensure a high reliability of the electroactive lens 1.

FIG. 3B illustrates an example wherein two lens foils 30 are integrated in the electroactive lens 1. The—first and second—conductive plugs 34A of the upper switchable electro activated lens 31 and the—first and second—conductive plugs 34B of the lower switchable electro activated lens 1 are illustrated. The position of the first upper conductive plug 34A may coincide with the position of the first lower conductive plugs 34A; the same applies to the positions of the second upper and lower conductive plugs. In other words, in the top view both the positions of the lower conductive plugs 34A and the lower conductive plugs 34B may correspond to the first positions 39A. Alternatively the positions of the upper conductive plugs 34A and the positions of the lower conductive plugs 34B may not coincide, e.g. when the positions of the upper conductive plugs 34A correspond to the first positions 39A and the positions of the lower conductive plugs 34B correspond to the second positions, or vice versa. In some embodiments, an optional transparent layer 9 may be placed between the lens foil 30 and the lower lens foil 38. However, in other embodiments the lower portion of the upper lens foil 30 is arranged directly on the lower lens foil 38.

FIGS. 4A, 4B, 4C, 4D illustrate a method of producing an electroactive lens. After a stack of three elements has been glued together with an adhesive to obtain the unfinished electroactive lens 1 as in FIG. 3A, the electroactive lens 1 is further modified to be incorporated in the spectacle frame 2. In order to align the liquid molecules in the optical device using an electric field, the electrodes 32 are to be coupled to a voltage source (not shown) arranged outside the electroactive lens 1. To this end, in a first step (the result of which is shown in FIG. 4A), holes are drilled in the first transparent body 10 and at least one lens foil 30 in a connection region 36 corresponding to the position of the conductive plugs 34. Preferably the hole extends through the entire axial length of the conductive plugs 34 and as such, the holes may also be drilled in the second transparent body 20. As illustrated in FIG. 4A, a hole is drilled in the axial direction of the electroactive lens 1. Further, a portion in the radial direction of the first transparent body may also be removed in a region adjacent to the connection region in order to allow a conductor to be arranged there.

FIG. 4B illustrates the electroactive lens 1 after a second step wherein the sides of the electroactive lens 1 are edged to fit the shape of the spectacle frame 2 wherein the electroactive lens 1 is to be arranged. To this end the sides of the electroactive lens 1 are edged up to the outer peripheral shape of the electroactive lens 1. As will be explained later, the adhesive 7 is preferably applied along a cut-out region, i.e. a region with a shape that corresponds to the spectacle frame 2 wherein the electroactive lens 1 is to be placed. Therefore the edging step removes portions of the first, second transparent bodies and the at least one lens foil outside of said cut-out region. As such, the portion of the at least one lens foil 30 remaining after this step is enclosed by the adhesive 7. As will be understood by a person skilled in the art, the first step and the second step may be performed in any order or simultaneously.

FIG. 4C illustrates the result of a third step, i.e. a step of coupling terminals 5 to the conductive plugs 34. Terminals 5 that are to be coupled to a voltage source arranged near, on and/or in the spectacle frame 2 are electrically coupled to connection elements 35 that are electrically coupled to the conductive plugs 34. The connection elements 35 may be formed by conductive silver paste or the like. Thereby an electrical connection is obtained between the terminals 5 and transparent electrodes 32 via the connection element 35, conductive plug 34 and the conductive layer 33. The connection element 35, the conductive plug 34, conductive layer 33 and conductor 5 may as such fulfill the function of the electric connection 8. The terminals 5 may be provided with an insulating layer 51. This insulating layer 51 may prevent unintentional conduction of electricity due to e.g. weather conditions. As such, the insulating layer 51 is preferably formed at least in a portion of the conductor 5 where the conductor 5 would otherwise be exposed to external conditions. The insulating layer 51 may also be covering a larger portion of the conductor 5 as long as at least a portion of the conductor 5 is in electrical contact with the electric connection 35.

In a fourth step a passivation layer 6 is applied in the region corresponding to the position of the conductor 5 to regain a substantially concave surface 12 of the first lens element 11. Preferably the passivation layer 6 is made of a material having substantially the same optical properties as the first lens element 11. Although in the illustrative examples of FIGS. 4A-4B only one optically switchable lens 31 is illustrated, the person skilled in the art will recognize that also more than one optically switchable lens 31 may be present as the at least one lens foil 30 in a similar manner.

FIGS. 5A, 5B, 5C, 5D illustrate a method of producing an electroactive lens in accordance with a further aspect of the disclosure. The method of establishing the electrical connections 8 as discussed above is similar to the method illustrated in FIGS. 5A, 5B, 5C, 5D. However the method illustrated in FIGS. 5A, 5B, 5C, 5D applies the electrical connection 8 (such as the conductive element) in the lateral direction of the electroactive lens 1, therefore similar elements discussed in the light of FIGS. 4A, 4B, 4C, 4D apply to FIGS. 5A, 5B, 5C, 5D. Thus, an aperture or hole is created from a lateral side and extending up to the axial surface of the conductive plug.

Similar to the second step discussed in the light of FIG. 4B, the unfinished electroactive lens 1 is preferably edged resulting in the electroactive lens 1 as in FIG. 5A. The electroactive lens 1 is edged according to the cut-out region.

Hereby the remaining portion of the at least one lens foil 30 is surrounded by the adhesive 7.

In a second step, a hole is drilled in the electroactive lens 1 in the radial direction of the electroactive lens 1 in a radial connection region 50 corresponding to the position of the conductive plugs 34. This step is similar to the first step discussed in the light of FIG. 4A, with the difference that the connection region 50 is in the radial direction while the connection region 36 is in the axial direction of the electroactive lens 1. The hole in the connection region 50 is provided up to and/or into the conductive plug 34 in order to electrically couple the conductor 5 with the conductive plug 34.

In a third step, the conductor 5 is coupled to the conductive plug 34. For example, a connection element may be provided such as silver paste to electrically couple the conductive plug 34 to the conductor 5.

In a fourth step resulting in the device as shown in FIG. 5D, a passivation layer 6 is added in the radial connection region 50 in order to protect the switchable electro activated lens 31 from the external environment and reduce the optical impact of the connection in the radial connection region 50.

In order to couple two or more optical devices 31 using the radial connections 50 as illustrated in FIGS. 5A, 5B, 5C, 5D, the configurations of the at least one lens foil 30 as illustrated in FIG. 2B may be used. Thereby two electrodes 32 of two optically switchable lenses 31 may be coupled to one conductor 5.

Figure 6:
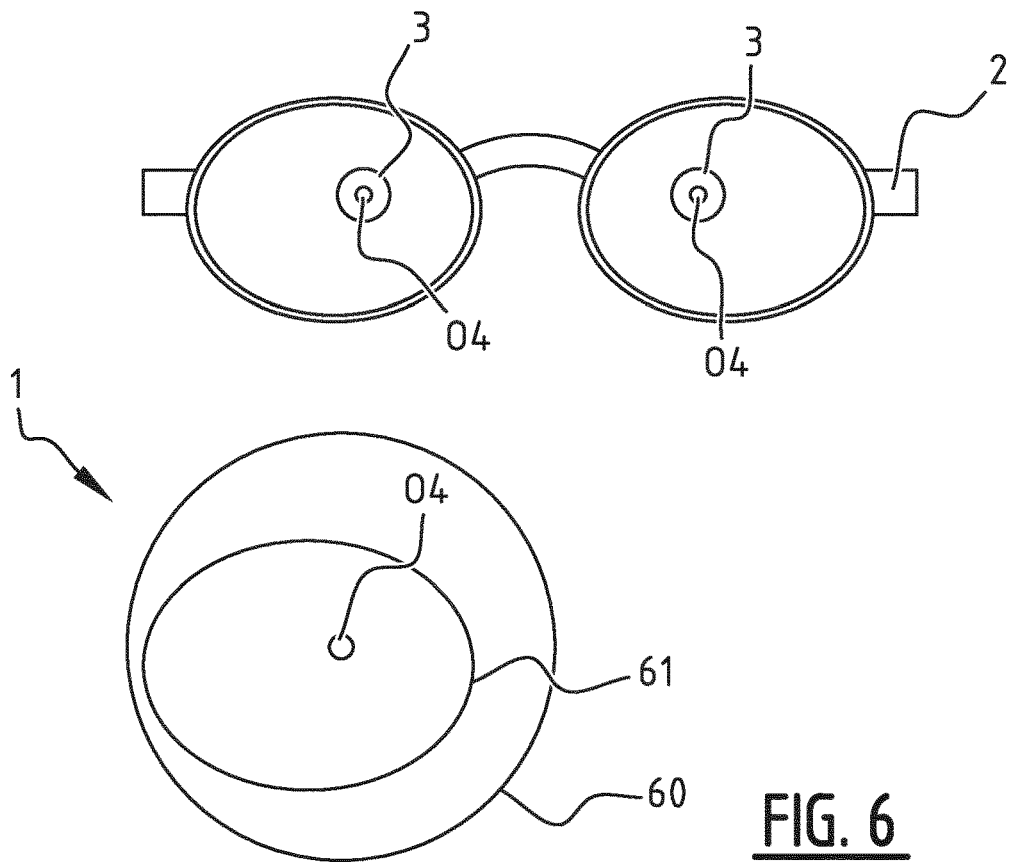
FIG. 6 illustrates an optical axis of a lens in a spectacle frame.

FIG. 6 illustrates the spectacle frame 2 and an unfinished electroactive lens 1 having the outer edge 60 prior to the edging as discussed in the light of FIGS. 4 and 5. The unfinished lens 1 is to be edged to thereby form an electroactive lens 1 according to the cut out shape 61 that corresponds to the shape of the frame 2. The first lens element 11 and second lens element 21 are preferably aligned such that their optical axes are aligned on the common optical axis O4. The common optical axis O4 is preferably positioned relative to a pupil position 3 of the pupil of the user to correct the vision of the user in a suitable manner Since this relative alignment in a suitable manner may differ among users, the cut-out shape 61 may be determined in accordance to the needs of the user and the choice of the user for a specific frame. After this determination is performed the cut out shape 61 is determined. The at least one lens foil 30 is preferably pre-fabricated. However, as discussed above the cut-out shape 61 may differ among users. As such, some steps may be required prior to the further assembly process discussed in FIGS. 4 and 5, the at least one lens foil 30 may be pretreated in order to be incorporated between the first and second transparent body.

Figure 7:
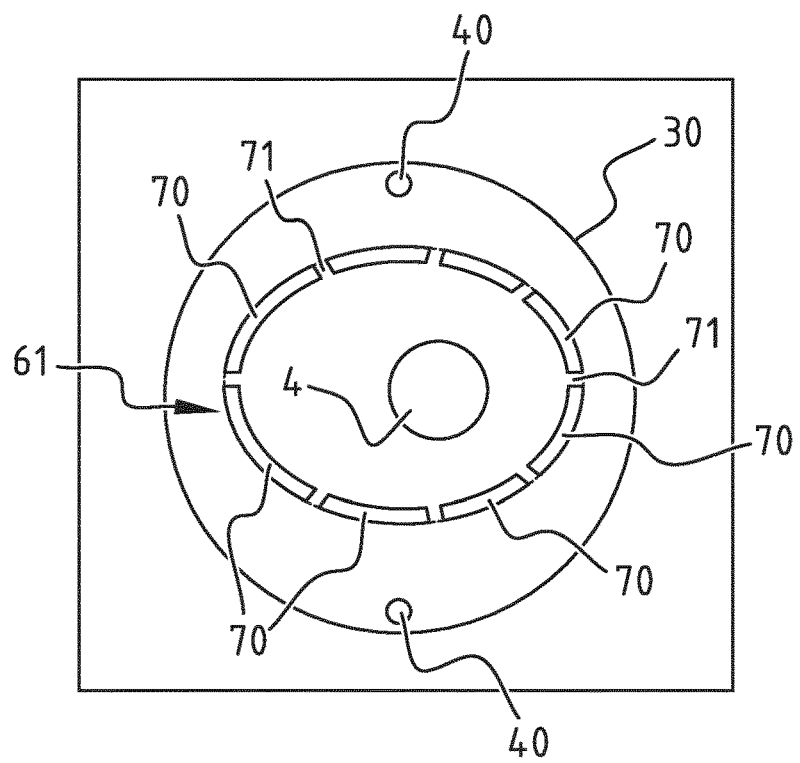
FIG. 7 illustrates an lens foil prior to integration thereof between a first transparent body and a second transparent body.

FIG. 7 illustrates the pre-fabricated at least one lens foil 30. In this at least one lens foil 30, prior to incorporation thereof in the first and second transparent body, the at least one lens foil 30 may be provided with glue channels 70. These glue channels 70 are provided along the periphery of the cut out-region 61. Between the glue channels 70 a plurality of connection portions 71 may not cut out in order to couple a region of the at least one lens foil 30 within the cut-out region 61 with a region of the at least one lens foil 30 outside of the cut-out region 61. Further, in some embodiments the at least one lens foil 30 may, at this stage prior to integration in between the first and second transparent body, be provided with one or more alignment holes 40 which will be discussed later. The connection portions 71 are preferably of relatively small width while still connecting the portion of the at least one lens foil 30 within the cut out region 61 and the portion of the at least one lens foil outside the cut out region 61. The adhesive 7 that will be applied in the glue channels 70 will seal the at least one lens foil 30 from the environment to ensure a high reliability of the electroactive lens 1, the connection portions 71 are configured such that this seal is reliable for example due to their relatively small width.

The at least one lens foil 30 comprises an optically switchable lens 31 comprising a Fresnel lens 4. This Fresnel lens 4 has a—third—optical axis O3. The third optical axis O3 may have to be aligned relatively to the common optical axis O4. In this case the cut out region 61 needs to be determined prior to providing the glue channels 70 and/or alignment holes 40. Thereby the glue channels 70 and/or alignment holes 40 may be provided in the third optical element 30 such that the optical axis O3 will be aligned with respect to the common optical axis O4 in a manner corresponding to the needs of the user.

Figure 8:
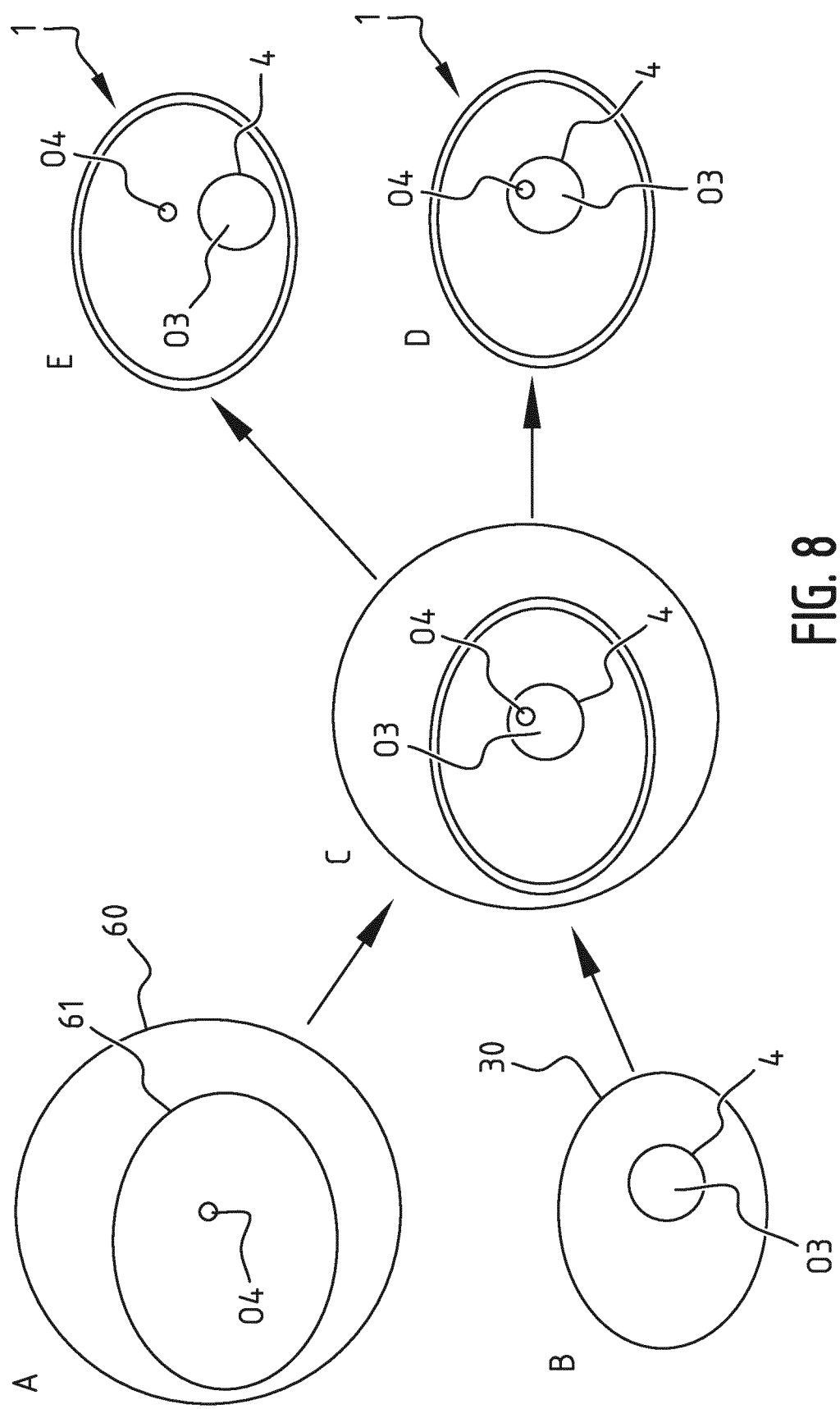
FIG. 8 illustrates the relative alignment of the optical axis of the optical device and the optical axes of the first lens element and the second lens element.

FIG. 8 illustrates how the at least one lens foil B is to be aligned relatively to the first and second transparent body A. The first and second transparent body A are illustrated with the outer peripheral edge 60. A region corresponding to the cut-out region 61 is also illustrated. The first and second transparent body A are aligned relative to the at least one lens foil B in step C, herein the stack formed by the first, second and at least one lens foil are further modified as discussed in the light of FIGS. 4 and 5. The result hereof is the electroactive lens D. As illustrated in D, the common optical axis O4 and the optical axis O3 of the Fresnel lens 4 of the at least one lens foil coincide. In some embodiments, the user may require a lens action of the Fresnel lens 4 at another position relative to the common optical axis O4 of the first and second transparent body, or in other words, in some embodiments the third optical axis O3 and the common optical axis O4 need to be distanced from each other. This can be achieved by choosing the cut-out region as illustrated in B accordingly to obtain the electroactive lens 1 as illustrated in E.

Figure 9:
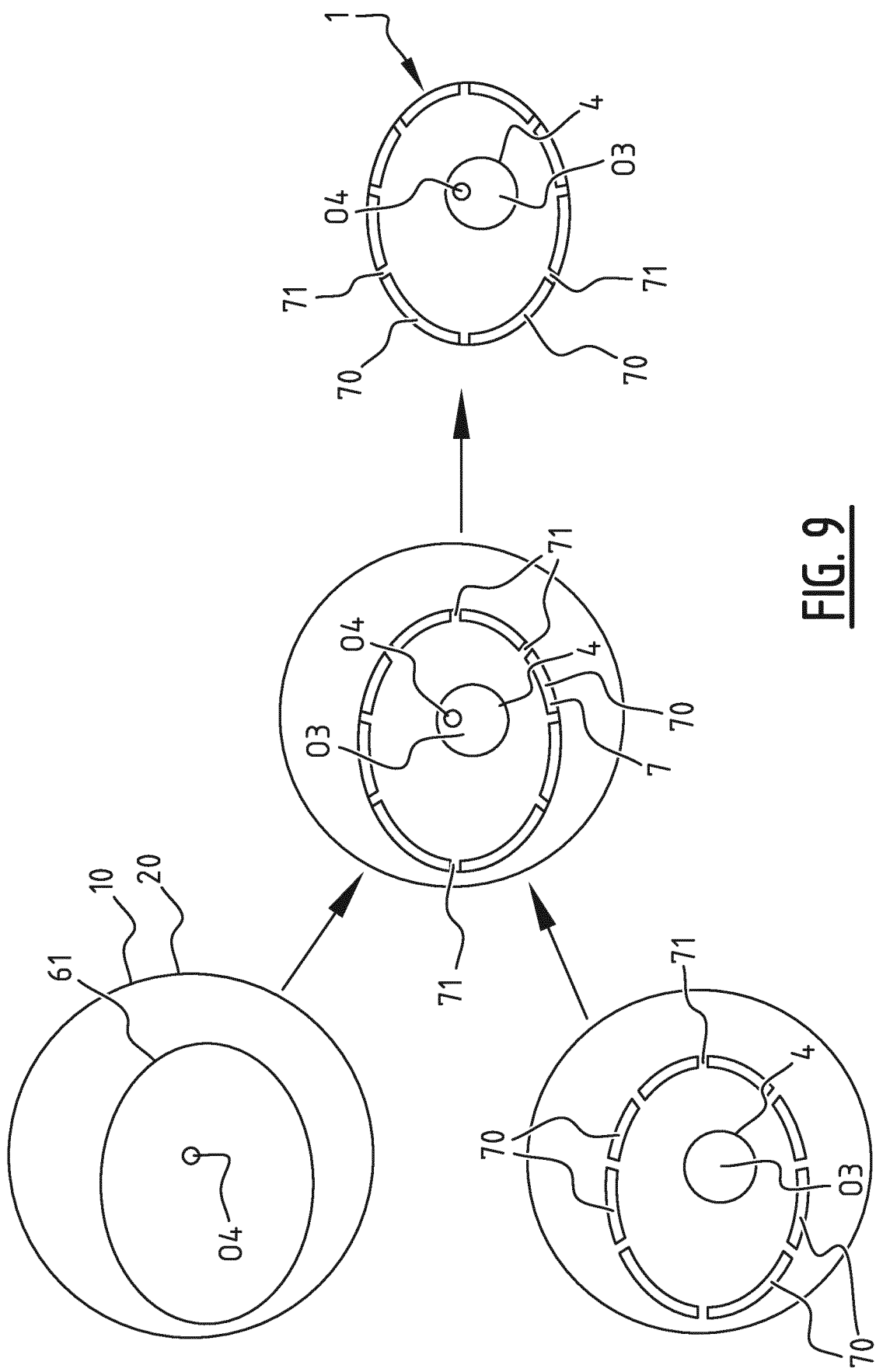
FIG. 9 illustrates the integration process of the lens foils in between the first transparent body and the second transparent body.

FIG. 9 illustrates how the at least one lens foil 30 comprising the glue channels 70 are incorporated into the first transparent body 10 and second transparent body 20. The cut-out region 61 in the first transparent body 10 and second transparent body 20 are illustrated as an example. The glue channels 70 are provided within said cut-out region in the at least one lens foil 30.

Figure 10:
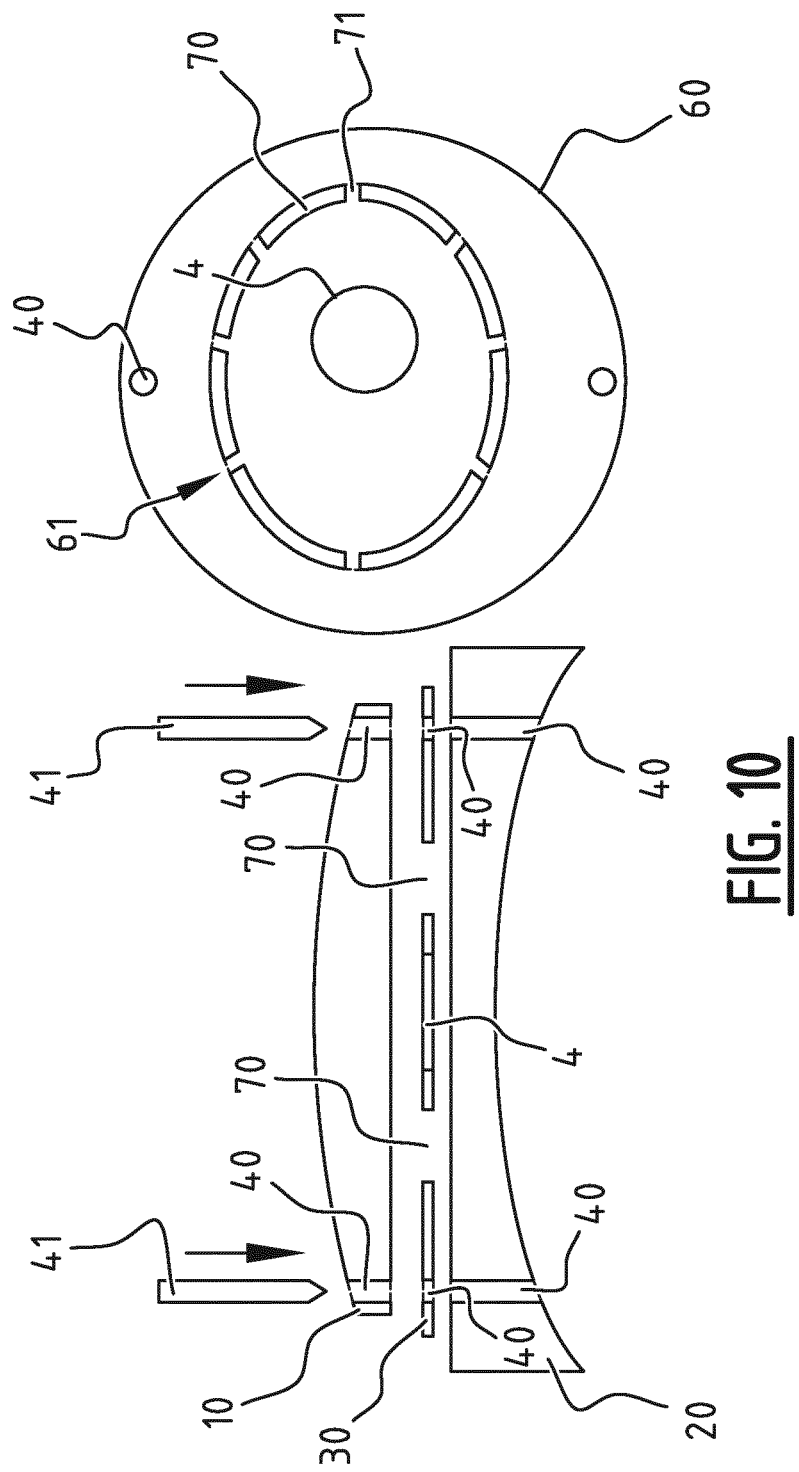
FIG. 10 illustrates the integration process of the lens foils in between the first lens element and the second lens element using alignment means.

FIG. 10 illustrates a method of mutually aligning the first transparent body 10, second transparent body 20, and at least one lens foil 30 using alignment means. Each of the first transparent body 10, second transparent body 20, and at least one lens foil 30 is provided with an alignment hole 40 at an appropriate position. The alignment holes 40 are provided outside the cut out region 61 and, as such the alignment holes 40 are arranged in a position that will be cut away during the assembly process as discussed in the light of FIG. 4 or 5. Or in other words, the alignment holes are provided at positions that are arranged outside a region enclosed by the glue channels 70. The first transparent body 10, second transparent body 20, and at least one lens foil 30 are aligned with alignment pins 41 that are inserted into the alignment holes 40. The alignment holes 40 have substantially the same diameter and cross-sectional shape as the alignment pins 41. Thereby, if the alignment pin 41 is inserted into a hole 40 of an element, movement of that element with respect to the alignment pin 41 in the radial direction is prevented. By using two or more pins 41, the elements can not move with respect to the alignment pins 41. Thereby the mutual alignment of the elements may be accurately achieved.

Figure 11:
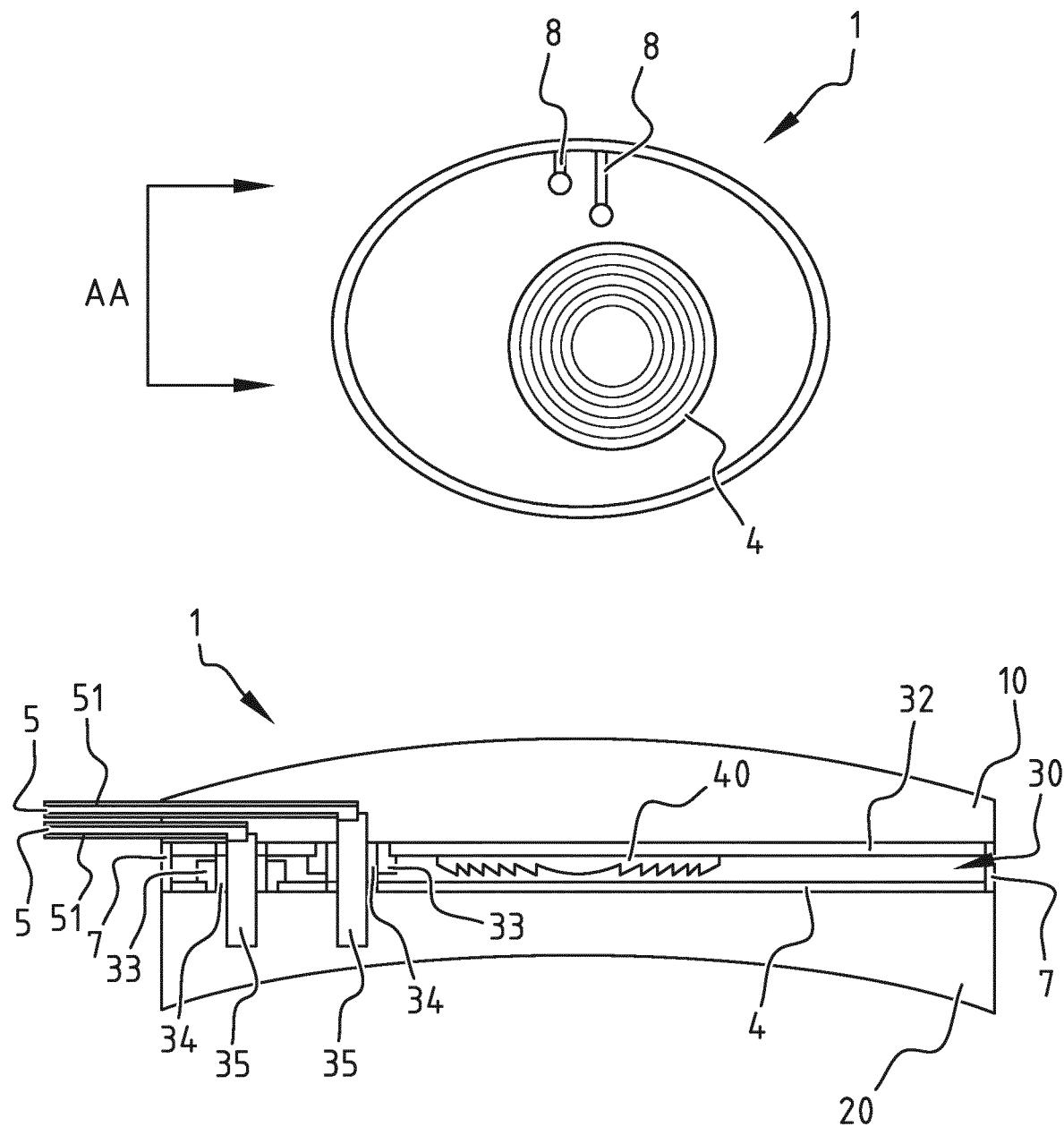
FIG. 11 illustrates a finished electroactive lens system from a front and a side view.

FIG. 11 illustrates another cross-section and top view of a finished electroactive lens 1. Due to the design variability of the present disclosure, the electronic connections 8, which comprise the terminals 5, electric connections 35, conductive plugs 34, and conductive layers 33 may be arranged relatively close to each other in the finished electroactive lens 1.

Figure 12A:
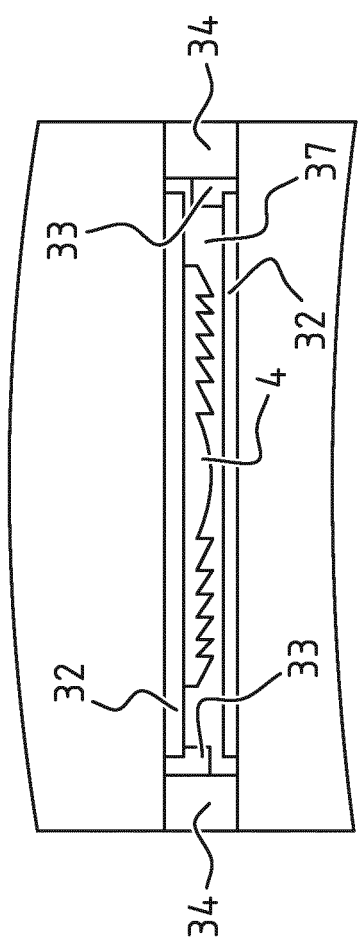
FIGS. 12A and 12B illustrate a further embodiment of an electroactive lens 1 according to embodiments of the present disclosure, for instance an electroactive lens as manufactured through a method according to the present disclosure.

FIGS. 12A and B illustrate a further embodiment of an electroactive lens 1 according to embodiments of the present disclosure, for instance an electroactive lens as manufactured through a method according to the present disclosure.

In previous embodiments of the apparatus, optical devices 31 have been discussed in which conductive plugs 34 were previously provided. For the present disclosure, a proper placement of the conductive plugs 34 may be relevant. In FIG. 12, electroactive lens 1 comprises conductive plugs 34 which are exposed on the outside of the lens, providing a contact surface for which it is easier to provide a suitable area for contact with external conductors.

In some of the previously described embodiments of the method for manufacturing, openings or holes were provided in electronic lens 1 to facilitate electrically coupling any external conductor with the conductive plugs 34. However, in other embodiments such openings may be dispensed with.

For instance, an embodiment of the method for manufacturing according to the present disclosure may comprise (at least) the following steps:

Similar to the previously discussed embodiments, optical device 31 comprising Fresnel lens 4 is to be placed in between lens elements 11, 21 at a position that is suitable for a particular user. The desired position may therefore again be dependent on a users' pupil and the actual spectacles wherein the lens elements are to be mounted, for instance.

As a first step, the appropriate position the Fresnel lens 4 in electroactive lens 1 is determined. This can be determined in a manner similar to the one of FIG. 6.

One this appropriate position is determined, the cut-off region for the optical device 31 is automatically also determined. That is, lens elements 11, 21 will be cut or edged in such a manner that the cut makes the lens elements suitable for the actual spectacles the electroactive lens 1 is to be mounted in. The optical device 31 is arranged in between said elements 11,21.

To manufacture the electroactive lens 1 as shown in FIG. 12, conductive plugs 34 should be arranged in optical device 31 at the border of the previously determined cut-out region 61. Therefore, before gluing optical device 31 in between the first and second lens elements 11, 21, said optical device 31 is again opened and one or more, preferably two conductive plugs 34 are arranged on the border of the cut-out region. It is however common for lenses to not have a completely flat side surface as electroactive lens 1 in FIG. 12 has. For example, a lens may be provided with a bevel, which is an additional thickening on the edge of a lens, often stretching over essentially the entire circumference of said lens. In embodiments of the present disclosure the bevel is partially removed in order to locally achieve a flat side surface so as to accommodate and expose the conductive plugs 34 Partially removing the bevel may be accomplished, for instance, by milling or similar operations.

Through said additional milling, it is possible to locally remove the complete bevel and to provide a completely flat side surface, similar to the one shown in FIG. 12. In other embodiment it sufficient to remove only part of the bevel.

Regardless of how much lens material of the bevel is removed, when the electroactive lens is milled further, conductive plugs 34 should preferably be placed outside the initial cut-out border 61, a little further radially inward of the lens. That is, the plugs 34 should be provided at a distance from the initial cut-out border 61 which corresponds with the amount of bevel which will be removed, which ensures that after said additional milling the conductive plugs 34 are properly exposed.

After the conductive plugs 34 are arranged in optical device 31, said device is arranged in between and glued to lens elements 11, 21, for example in line with a process as described in accordance with FIG. 2A.

Figure 12B:
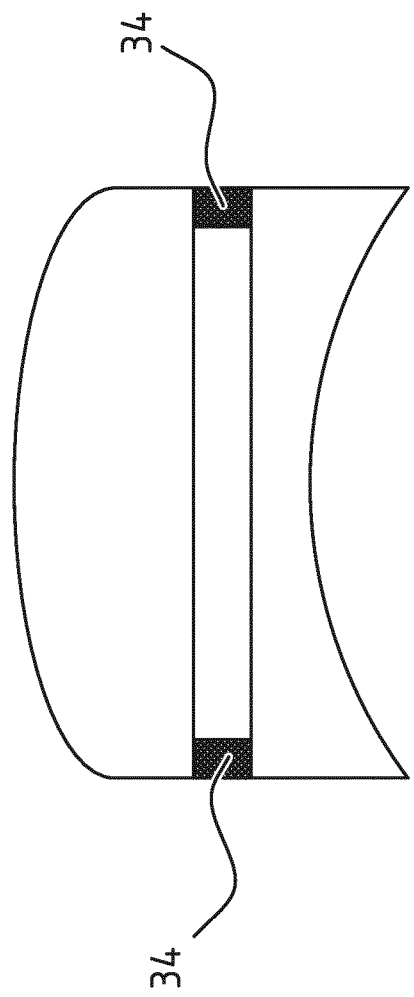
Figure 13A:
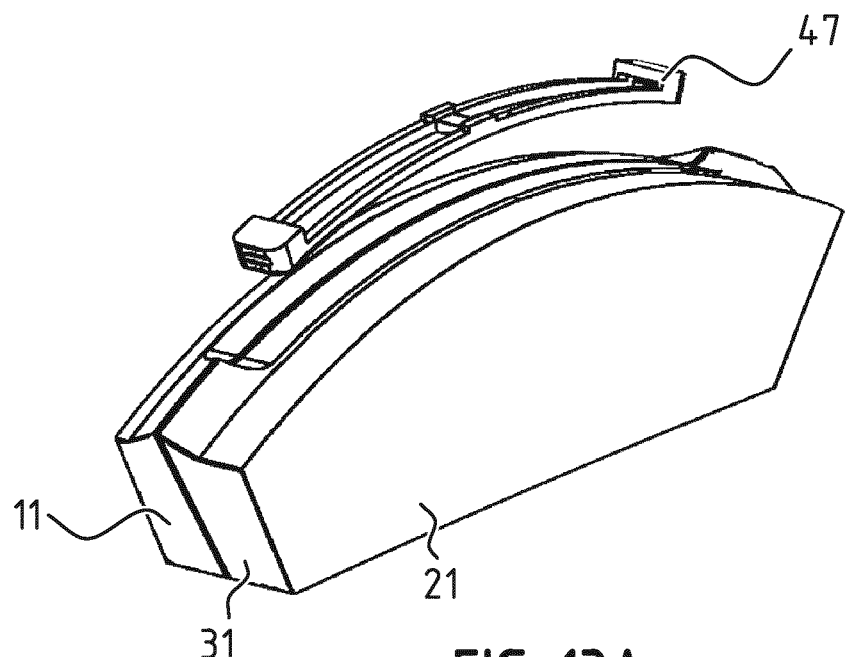
FIGS. 13A and 13B show an embodiment of an external connector as mentioned the context of FIGS. 12A and 12B.
Figure 13B:
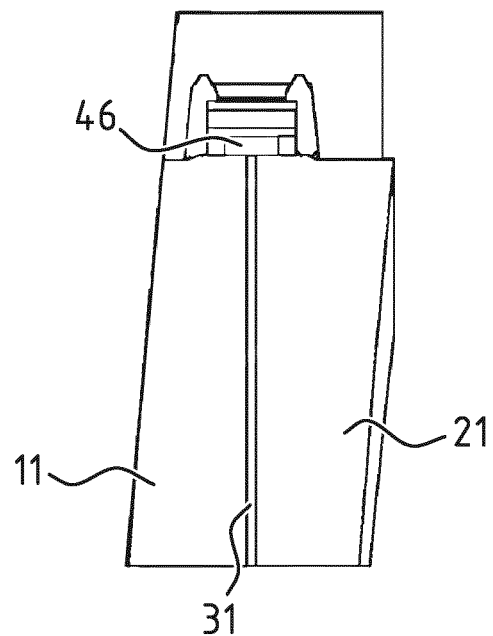

FIGS. 13A and 13B show (in an exploded view and in cross-section, respectively) an embodiment of a protective body 47 for an external connector as mentioned the context of FIGS. 12A and 12B. The external connector 47 provides an electrical connection between the exposed conductive plugs 34 of the embodiment of FIGS. 12A and 12B (the conductive plugs 34 not being shown in FIGS. 13A and 13B) and further electronics as part of the electronic glasses, as it comprises a conductive body 46. The conductive body 46 can for example be formed by curing silver ink on the side of the electrical lens. The protective body 47 is configured to protect the conductive body 46 against external influence such as moist and/or impact. The protective body 47 may be shaped to at least partially surround the protective body 47 and/or may be made of material which has more resilient and water resistant properties such as rubber. In case of the silver ink, the protective body 47 can also help keeping the ink in place while it is curing.

It is to be understood that this disclosure is not limited to particular aspects described, and, as such, may vary. It is also to be understood that the terminology used herein is for the purpose of describing particular aspects only, and is not intended to be limiting, since the scope of the present disclosure will be limited only by the appended claims.

LIST OF REFERENCE NUMERALS

1 Electroactive lens
2 Spectacle frame
3 Pupil of a user
4 Fresnel structure
5 Terminals
6 Passivation layer
7 Adhesive
8 Electric connections
9 Transparent layer
10 First transparent body
11 First lens element
12 Convex surface first transparent body
13 Flat surface first transparent body
20 Second transparent body
21 Second lens element
22 Concave surface second transparent body
23 Flat surface second transparent body
30 At least one lens foil
31 Optical device
32 Transparent electrode
33 Conductive layer
34 Conductive plug
35 Connection element
36 Connection region
37 Volume
38 Lower optical device
39 Conductive plug position in top view
40 Alignment holes
41 Alignment pins
42,43 Aperture or hole
44,55 Axis of conductive plug 34
46 Conductive body
47 Protective body
50 Radial connection region
51 Insulating layer
60 Outer region first or second transparent body prior to edging
61 Cut out region
70 Glue channels
71 Connection portions
O1 First optical axis
O2 Second optical axis
O3 Third optical axis
O4 Common optical axis

The invention claimed is:

1. A lens foil comprising:
a first substrate with a first transparent electrode;
a second substrate with a second transparent electrode;
a Fresnel lens and liquid crystalline material between the first transparent electrode and the second transparent electrode, wherein the first transparent electrode, the second transparent electrode, the Fresnel lens and the liquid crystalline material define an optical device having an optical axis in at least one state of the optical device; and
first and second conductive plugs extending through the lens foil, wherein the first and second conductive plugs are positioned relative to the optical axis of the Fresnel lens such that radial lines extending from the optical axis to the first and second conductive plugs mutually enclose an angle of less than 120 degrees.

2. The lens foil as claimed in claim 1, further comprising:
a first conductive layer which is provided on and electrically coupled to the first transparent electrode; and
a second conductive layer which is provided on and electrically coupled to the second transparent electrode, wherein the first conductive layer and/or the second conductive layer has a greater thickness in an axial direction of the Fresnel lens than the first transparent electrode and/or the second transparent electrode, and wherein the first conductive layer and/or the second conductive layer are electrically coupled to a first conductive plug and/or a second conductive plug, respectively.

3. The lens foil as claimed in claim 1,
wherein a portion of the first transparent electrode and/or the second transparent electrode are each absent in a region between the Fresnel lens and the first conductive plug and/or the second conductive plug, and/or
wherein the conductive plugs each have a plug axis extending substantially perpendicular to the transparent electrode, and/or
wherein the conductive plugs have a thickness in a plug axis direction of multiples times an electrode thickness of at least one of the electrodes.

4. The lens foil as claimed in claim 1, wherein:
the lens foil includes a first lens foil and a second lens foil within a stack of the first lens foil and the second lens foil,
the liquid crystalline material of the first lens foil and the second lens foil is nematic liquid crystalline material, and
the optical device of the first lens foil is oriented at a 90 degrees angle relative to the optical device of the second lens foil.

5. The lens foil according to claim 4, wherein:
at least one of the first and second conductive plugs of the first and second lens foils are oriented such that a respective plug axis of the at least one of the first and second conductive plugs of the first and second lens foils are aligned, and
the at least one of the first and second conductive plugs are mutually electrically connected.

6. The lens foil as claimed in claim 1, wherein:
the lens foil is sandwiched between a first transparent body and a second transparent body,
a stack of at least the lens foil, the first transparent body, and the second transparent body form an electroactive lens system,
the conductive plugs have a plug axis extending substantially perpendicular to the transparent electrode and each of which conductive plugs is provided with an axial surface extending at least largely parallel to the plug axis, at which axial surface the conductive plugs each contact auxiliary conductive material that is connected to a conductive element extending outside the stack.

7. The lens foil as claimed in claim 6, wherein:
the first transparent body and the second transparent body each have an optical axis which are mutually aligned on a common optical axis,
the optical axis of the lens foil is arranged distinct from the common optical axis, and
the optical axis of the lens foil is oriented parallel to the common optical axis, but is shifted thereto laterally.

8. The lens foil according to claim 6, wherein:
the axial surface is an annular surface, and
the auxiliary conductive material extends in the axial direction, both within the annular surface and through at least one of the first transparent body and the second transparent body to an outside surface thereof, where it is connected to the conductive element.

9. The lens foil according to claim 6, wherein the auxiliary conductive material extends laterally from the axial surface within a conductor channel.

10. A pair of glasses comprising at least one electroactive lens system as claimed in claim 6, further comprising:
a controller for controlling a signal for switching the liquid crystalline material within the optical device between at least a first and a second state.

11. A mutually attached stack of a first and a second lens foils each comprising a first substrate with a first transparent electrode, and a second substrate with a second transparent electrode, between which transparent electrodes a Fresnel lens and liquid crystalline material are present, wherein:
the transparent electrodes, the Fresnel lens and the liquid crystalline material define an optical device,
each lens foil further comprises a first conductive plug and a second conductive plug extending through the lens foil, and
the first and second conductive plug are positioned relative to an optical axis of the Fresnel lens such that radial lines extending from the optical axis to the first conductive plug and the second conductive plug mutually enclose an angle of less than 120 degrees.

12. The stack of claim 11, wherein the liquid crystalline material of the first and second lens foil is nematic liquid crystalline material, and wherein the optical device of the first lens foil is oriented at a 90 degrees angle relative to the optical device of the second lens foil.

13. The stack according to claim 11,
wherein the conductive plugs have a plug axis extending substantially perpendicular to the transparent electrode,
wherein the conductive plugs of the first and second lens foils are oriented such that an axis of a first conductive plugs of both lens foils are aligned, and
wherein the first conductive plugs are mutually electrically connected.

14. The stack according to claim 13, wherein an axis of a second conductive plugs of both lens foils are aligned, and wherein the second conductive plugs are mutually electrically connected.

15. The stack according to claim 11, wherein the radial lines extending from the optical axis to the first conductive plug and the second conductive plug mutually enclose an angle of less than 90 degrees.

16. The lens foil as claimed in claim 1, wherein a portion of the first transparent electrode and/or the second transparent electrode are each absent in a region between the Fresnel lens and the first conductive plug and/or the second conductive plug.

17. The lens foil as claimed in claim 1, wherein the conductive plugs each have a plug axis extending substantially perpendicular to the transparent electrode.

18. The lens foil as claimed in claim 1, wherein the conductive plugs have a thickness in a plug axis direction of multiples times an electrode thickness of at least one of the electrodes.

19. The lens foil according to claim 9, wherein a part of the conductive element is present in the conductor channel.

* * * * *